(12) United States Patent
Lee et al.

(10) Patent No.: US 12,493,381 B2
(45) Date of Patent: Dec. 9, 2025

(54) TOUCH DISPLAY DEVICE AND TOUCH DRIVING METHOD

(71) Applicant: LG Display Co., Ltd., Seoul (KR)

(72) Inventors: DongHoon Lee, Paju-si (KR); GeunHo Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/667,595

(22) Filed: May 17, 2024

(65) Prior Publication Data

US 2025/0156009 A1    May 15, 2025

(30) Foreign Application Priority Data

Nov. 14, 2023    (KR) .......................... 10-2023-0157204

(51) Int. Cl.
*G06F 3/041*       (2006.01)
*G06F 3/044*       (2006.01)
*G09G 3/3233*     (2016.01)

(52) U.S. Cl.
CPC .......... *G06F 3/0418* (2013.01); *G06F 3/0412* (2013.01); *G06F 3/04166* (2019.05); *G09G 3/3233* (2013.01); *G06F 3/044* (2013.01); *G09G 2300/0842* (2013.01); *G09G 2330/06* (2013.01); *G09G 2354/00* (2013.01)

(58) Field of Classification Search
CPC .. G06F 3/0412; G06F 3/0418; G06F 3/04166; G06F 3/044; G09G 3/3233; G09G 2354/00; G09G 2330/06; G09G 2300/0842

See application file for complete search history.

(56) References Cited

U.S. PATENT DOCUMENTS

| | | | |
|---|---|---|---|
| 12,099,679 B2 | 9/2024 | Park et al. | |
| 2022/0171498 A1* | 6/2022 | Oh | ....................... G06F 3/04166 |
| 2023/0185400 A1 | 6/2023 | Park et al. | |
| 2024/0411401 A1 | 12/2024 | Park et al. | |

FOREIGN PATENT DOCUMENTS

KR    10-2022-0094119 A    7/2022
KR    10-2023-0087188 A    6/2023

* cited by examiner

*Primary Examiner* — Yaron Cohen
(74) *Attorney, Agent, or Firm* — Fenwick & West LLP

(57) ABSTRACT

A touch display device, comprising a display panel in which a plurality of subpixels are disposed in a display area, and a first pseudo signal line and a second pseudo signal line are disposed in a non-display area, a gate driving circuit configured to supply gate signals to the display panel using a plurality of gate clocks, a touch circuit configured to supply a plurality of touch driving signals to touch electrodes disposed on the display panel and detect touch coordinates by receiving touch sensing signals, a timing controller configured to control the gate driving circuit and the touch circuit, and a pseudo signal control circuit configured to control paths of a first pseudo signal and a second pseudo signal supplied to the first pseudo signal line and the second pseudo signal line.

18 Claims, 22 Drawing Sheets

TOUCH DISPLAY DEVICE AND TOUCH DRIVING METHOD

CROSS-REFERENCE TO RELATED APPLICATION

This application claims priority from Republic of Korea Patent Application No. 10-2023-0157204, filed on Nov. 14, 2023, which is hereby incorporated by reference in its entirety.

FIELD

Embodiments of the disclosure relate to a touch display device and a touch driving method, and more particularly, to a touch display device and a touch driving method capable of reducing effectively electromagnetic noise.

BACKGROUND

Representative display devices for displaying an image based on digital data include liquid crystal display (LCD) devices using liquid crystal and organic light emitting display devices using organic light emitting diodes OLEDs.

Among these display devices, organic light emitting display devices use light emitting diodes that emit light on their own, so they have advantages in terms of fast response speed, contrast ratio, luminous efficiency, luminance, and viewing angle. In this case, the light emitting diode can be implemented as an inorganic or organic material.

The organic light emitting display device may include light emitting diodes disposed in each of a plurality of subpixels arranged on a display panel, and may control the luminance expressed by subpixels and display images by controlling the voltage flowing through the light emitting diodes and thereby emitting light in each light emitting diode.

In order to provide more diverse functions, these display devices may provide functions to recognize touch of the user's finger or pen on the display panel and perform input processing based on the recognized touch.

As an example, a touch display device capable of touch recognition may include a plurality of touch electrodes disposed or embedded in a display panel, and may drive these touch electrodes to detect the presence of a user's touch on the display panel and touch coordinates.

The touch display device may include signal lines that transmit various signals, and electromagnetic noise may be generated inside and outside the touch display device by signals supplied to the signal lines.

Likewise, when electromagnetic noise is generated in the touch display device, malfunctions may occur in touch sensing operation due to electromagnetic noise and image quality may be degraded.

Therefore, there is a need to reduce electromagnetic noise generated in touch display devices.

SUMMARY

Accordingly, the inventors of the disclosure have invented a touch display device and a touch driving method capable of reducing an error due to electromagnetic noise.

Embodiments of the disclosure may provide a touch display device and a touch driving method capable of reducing electromagnetic noise and driving at low power by forming a pseudo gate clock line and a pseudo touch line in a non-display area.

Further, embodiments of the disclosure may provide a touch display device and a touch driving method capable of increasing offset efficiency of electromagnetic noise by supplying a pseudo gate signal to a pseudo touch line in a touch processing period for processing touch sensing signals.

Embodiments of the disclosure may provide a touch display device comprising a display panel in which a plurality of subpixels are disposed in a display area, and a first pseudo signal line and a second pseudo signal line are disposed in a non-display area, a gate driving circuit configured to supply gate signals to the display panel using a plurality of gate clocks, a touch circuit configured to supply a plurality of touch driving signals to touch electrodes disposed on the display panel and detect touch coordinates by receiving touch sensing signals, a timing controller configured to control the gate driving circuit and the touch circuit, and a pseudo signal control circuit configured to control paths of a first pseudo signal and a second pseudo signal supplied to the first pseudo signal line and the second pseudo signal line.

Embodiments of the disclosure may provide a touch driving method of comprising a step of supplying a plurality of touch driving signals to touch electrodes disposed on a display panel, a step of supplying a first pseudo signal through a first pseudo signal line disposed in a non-display area of the display panel, a step of supplying gate signals to the display panel using a plurality of gate clocks, a step of supplying a second pseudo signal through a second pseudo signal line disposed in a non-display area of the display panel, and a step of controlling paths of the first pseudo signal and the second pseudo signal.

According to embodiments of the disclosure, it is possible to reduce an error due to electromagnetic noise.

According to embodiments of the disclosure, it is possible to reduce electromagnetic noise and drive at low power by forming a pseudo gate clock line and a pseudo touch line in a non-display area.

According to embodiments of the disclosure, it is possible to increase offset efficiency of electromagnetic noise by supplying a pseudo gate signal to a pseudo touch line in a touch processing period for processing touch sensing signals.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
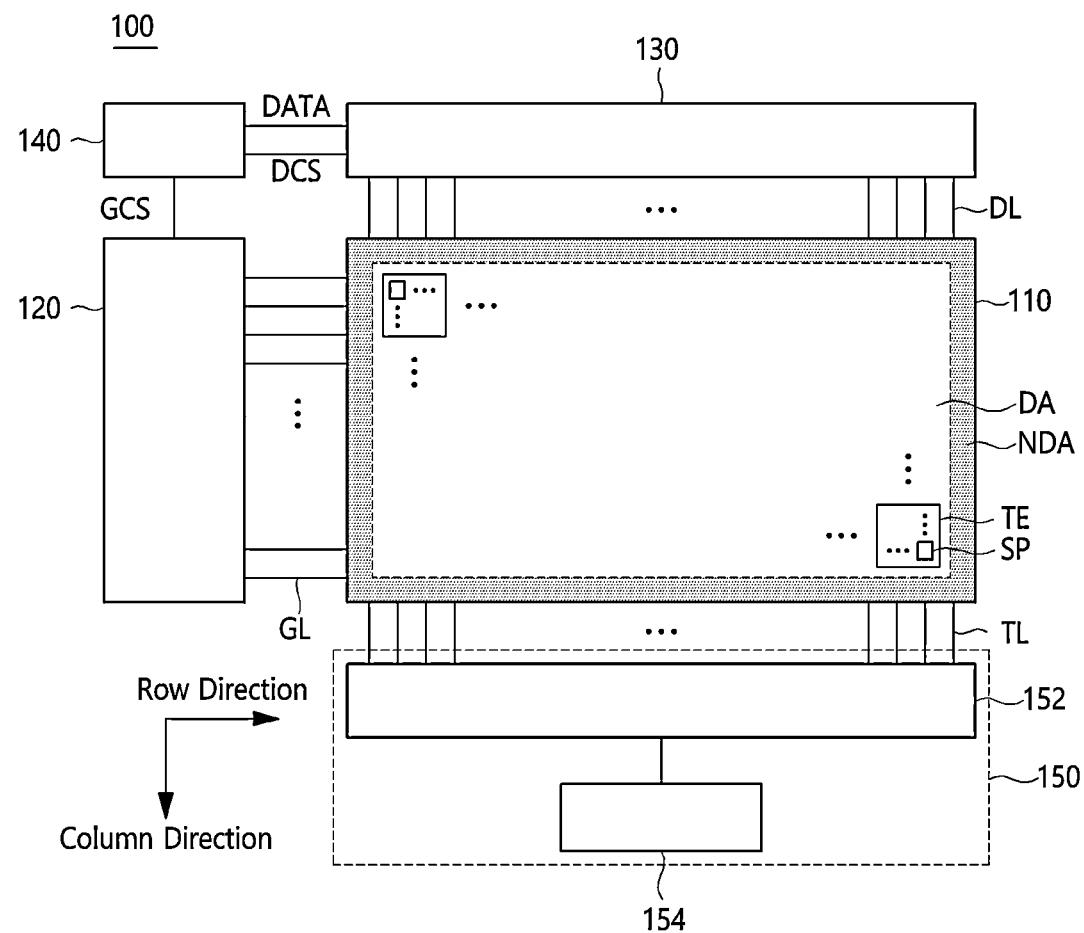
FIG. 1 is a view schematically illustrating a configuration of a touch display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a configuration of a touch display device according to embodiments of the disclosure.

Referring to FIG. 1, a touch display device 100 according to embodiments of the disclosure may include a display panel 110, a data driving circuit 130, a gate driving circuit 120, and a timing controller 140 as components for displaying images.

The display panel 110 may include a display area DA in which images are displayed and a non-display area NDA in which no image is displayed.

The non-display area NDA may be an outer area of the display area DA and be referred to as a bezel area. The non-display area NDA may be an area visible from the front of the touch display device 100 or an area that is bent and not visible from the front of the touch display device 100.

The display panel 110 may include a plurality of subpixels SP. For example, the touch display device 100 may be various types of display devices including a liquid crystal display device, an organic light emitting display device, a micro light emitting diode (micro-LED) display device, and a quantum dot display device.

The structure of each of the plurality of subpixels SP may vary according to the type of the touch display device 100. For example, when the touch display device 100 is a self-emission display device in which the subpixels SP emit light by themselves, each subpixel SP may include a light emitting element that emits light by itself, one or more transistors, and one or more capacitors.

The display panel 110 may further include various types of signal lines to drive the plurality of subpixels SP. For example, various types of signal lines may include a plurality of data lines DL transferring data signals (also referred to as data voltages or image data) and a plurality of gate lines GL transferring gate signals (also referred to as scan signals).

The plurality of data lines DL and the plurality of gate lines GL may cross each other. Each of the plurality of data lines DL may be disposed while extending in a column direction. Each of the plurality of gate lines GL may be disposed while extending in a row direction.

Here, the column direction and the row direction are relative. For example, the column direction may be a vertical direction and the row direction may be a horizontal direction. As another example, the column direction may be a horizontal direction and the row direction may be a vertical direction.

The data driving circuit 130 is a circuit for driving the plurality of data lines DL, and may output data signals to the plurality of data lines DL. The gate driving circuit 120 is a circuit for driving the plurality of gate lines GL, and may supply gate signals to the plurality of gate lines GL.

The timing controller 140 is a device for controlling the data driving circuit 130 and the gate driving circuit 120 and may control driving timings for the plurality of data lines DL and driving timings for the plurality of gate lines GL.

The timing controller 140 may supply various types of data driving control signals DCS to the data driving circuit 130 to control the data driving circuit 130 and may supply various types of gate driving control signals GCS to the gate driving circuit 120 to control the gate driving circuit 120.

The data driving circuit 130 may supply data signals to the plurality of data lines DL according to the driving timing control by the timing controller 140. The data driving circuit 130 may receive digital image data DATA from the timing controller 140 and may convert the received image data DATA into analog data signals and output them to the plurality of data lines DL.

The gate driving circuit 120 may supply gate signals to the plurality of gate lines GL according to the timing control of the timing controller 140. The gate driving circuit 120 may receive a first gate voltage corresponding to a turn-on level voltage and a second gate voltage corresponding to a turn-off level voltage, along with various gate driving control signals GCS, generate gate signals, and supply the generated gate signals to the plurality of gate lines GL. The turn-on level voltage may be a high-level voltage, and the turn-off level voltage may be a low-level voltage. Conversely, the turn-on level voltage may be a low-level voltage, and the turn-off level voltage may be a high-level voltage.

At this time, the gate driving circuit 120 may include one or more gate driving integrated circuits (GDIC), and may be located only on one side or both sides of the display panel 110 depending on the driving method. Alternatively, the gate driving circuit 120 may be implemented in the form of a Gate In Panel (GIP) formed directly in the non-display area NDA of the display panel 110.

To provide a touch sensing function as well as an image display function, the touch display device 100 may include a touch screen panel and a touch circuit 150 that senses the touch screen panel to detect whether a touch occurs by a touch object, such as a finger or pen, or the position of the touch.

The touch circuit 150 may include a touch driving circuit 152 that drives and senses the touch screen panel and generates and outputs touch sensing data and a touch controller 154 that may detect an occurrence of a touch or the position of the touch using touch sensing data.

The touch screen panel may include a plurality of touch electrodes TE as touch sensors. The touch screen panel may further include a plurality of touch lines TL for electrically connecting the plurality of touch electrodes TE and the touch driving circuit 152. The touch screen panel or touch electrode TE is also referred to as a touch sensor.

The touch screen panel may exist outside or inside the display panel 110. When the touch screen panel exists outside the display panel 110, the touch screen panel is referred to as an external-type touch screen panel. When the touch screen panel is of the external type, the touch screen panel and the display panel 110 may be separately manufactured or may be combined. The external-type touch screen panel may include a substrate and a plurality of touch electrodes TE on the substrate.

When the touch screen panel exists inside the display panel 110, the touch screen panel is referred to as an internal-type touch screen panel. In the internal-type touch screen panel, the touch screen panel may be formed in the display panel 110 during a manufacturing process of the display panel 110.

The touch driving circuit 152 may supply a touch driving signal to at least one of the plurality of touch electrodes TE and detect a touch sensing signal transferred from at least one touch electrode TE among the plurality of touch electrodes TE, generating touch sensing data.

The touch circuit 150 may perform touch sensing in a self-capacitance sensing scheme or a mutual-capacitance sensing scheme.

When the touch circuit 150 performs touch sensing in the self-capacitance sensing scheme, the touch circuit 150 may perform touch sensing based on capacitance between each touch electrode TE and the touch object (e.g., finger or pen).

When the touch circuit 150 performs touch sensing in the mutual-capacitance sensing scheme, the touch circuit 150 may perform touch sensing based on capacitance between the touch electrodes TE.

According to the mutual-capacitance sensing scheme, the plurality of touch electrodes TE are divided into driving touch electrodes and sensing touch electrodes. The touch driving circuit 152 may drive the driving touch electrode by the touch driving signal and may detect the touch sensing signal from the sensing touch electrode.

According to the self-capacitance sensing scheme, each of the plurality of touch electrodes TE may serve both as a driving touch electrode and as a sensing touch electrode. The touch driving circuit 152 may drive all or some of the plurality of touch electrodes TE and sense all or some of the plurality of touch electrodes TE.

The touch driving circuit 152 and the touch controller 154 may be implemented as separate devices or as a single device.

In other embodiments, the touch driving circuit 152 and the data driving circuit 130 may be implemented as separate integrated circuits. Alternatively, the whole or part of the touch driving circuit 152 and the whole or part of the data driving circuit 130 may be integrated into a single integrated circuit.

The touch display device 100 according to embodiments of the disclosure may be a self-emissive display device having self-emissive light emitting elements disposed on the display panel 110, such as an organic light emitting display device, a quantum dot display device, a micro-LED display device, and the like.

Figure 2:
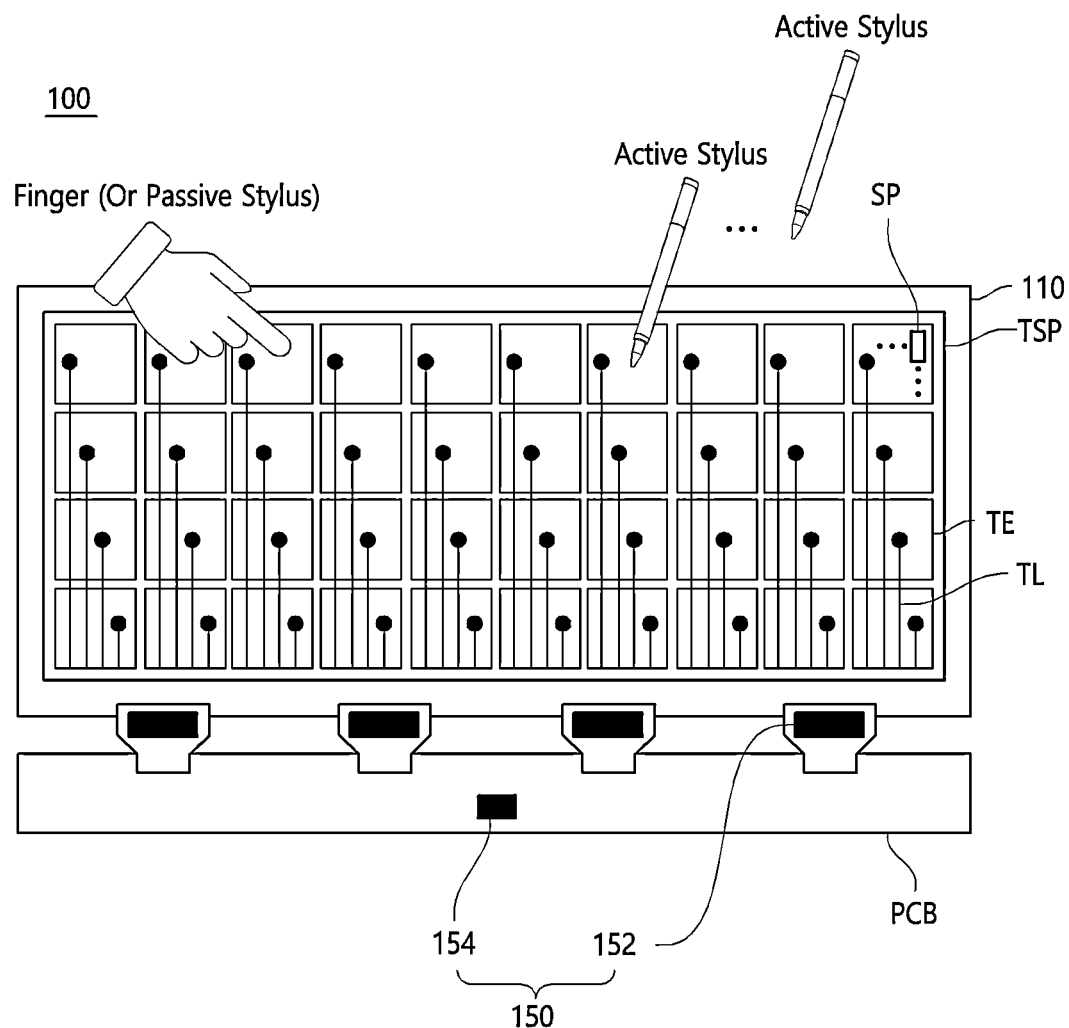
FIG. 2 illustrates a touch sensing system of the touch display device according to embodiments of the disclosure.

FIG. 2 illustrates a touch sensing system of the touch display device according to embodiments of the disclosure.

Referring to FIG. 2, the touch display device 100 according to embodiments of the present disclosure may be, for example, a display device capable of providing a function of sensing a touch of a passive stylus such as a finger, a conductive object, or the like, and a function of sensing a touch of an active stylus such as a pen, in addition to a function of displaying images.

The touch display device 100 according to embodiments of the disclosure may be a display device in which a touch screen panel TSP including a plurality of touch electrodes TE as touch sensors is embedded into a display panel 110. For example, the touch display device 100 may be a television TV, a monitor, or the like, or a mobile device such as a tablet, a smart phone, or the like.

For example, the touch display device 100 may divide a common electrode used in a display driving period into a plurality of groups and then use the plurality of divided groups as a plurality of touch electrodes TE.

In another example, the touch display device 100 may use a plurality of touch electrodes TE as touch sensing electrodes or touch driving electrodes.

The display panel 110 may be a liquid crystal display (LCD) panel, an organic light emitting diode (OLED) panel, or the like.

For example, when the display panel 110 is the liquid crystal display panel, the touch display device 100 may divide a common electrode, to which a common voltage is applied, which forms electric fields with pixel electrodes into a plurality of groups and then use the plurality of divided groups as respective touch electrodes TE.

In another example, when the display panel 110 is the organic light emitting diode (OLED) panel, the touch display device 100 may include an organic light emitting diode (OLED) composed of a first electrode, an organic light emitting layer, and a second electrode, an encapsulation layer located on the OLED and having a encapsulating function, and a touch sensor metal layer located on the encapsulation layer. Here, a plurality of touch electrodes may be formed on the touch sensor metal layer.

Hereinafter, for convenience of description and ease of understanding, it is assumed that a plurality of touch electrodes TE are used as touch driving electrodes (touch sensors) in the process of touch driving, and are used as a common electrode in the process of display driving.

The touch display device 100 may include a touch circuit 150 performing touch sensing and stylus sensing using signals received through the display panel 110 by driving the display panel 110 in which the touch screen panel TSP is integrated.

The touch circuit 150 may include a first circuit for supplying the touch driving signal to the touch electrode TE and receiving the touch signal through a touch line TL, and a second circuit for detecting passive touch sensing (finger touch sensing) and active touch sensing using the touch signal received through the display panel 110.

The first circuit may be referred to as a touch driving circuit 152, and the second circuit may be referred to as a touch controller 154.

The touch driving circuit 152 may be implemented as an integrated driving circuit together with the data driving circuit 130 for driving the data lines.

The touch driving circuit 152 may be implemented in a type of Chip On Film (COF) mounted on a film.

The film on which the touch driving circuit 152 is mounted may be attached to a bonding portion of the display panel 110 and a bonding portion of the printed circuit board (PCB), respectively.

The touch controller 154 etc. may be mounted on the printed circuit board (PCB).

The touch driving circuit 152 and the data driving circuit 130 may be implemented as separate driving chips. The touch driving circuit 152 may be electrically connected to the plurality of touch electrodes TE included in the display panel 110 through a plurality of touch lines TL.

At this time, the touch driving circuit 152 may perform touch sensing operation during a touch period from a display driving period separately divided in time. In another example, the touch driving circuit 152 may perform touch sensing process and display driving process simultaneously.

Figure 3:
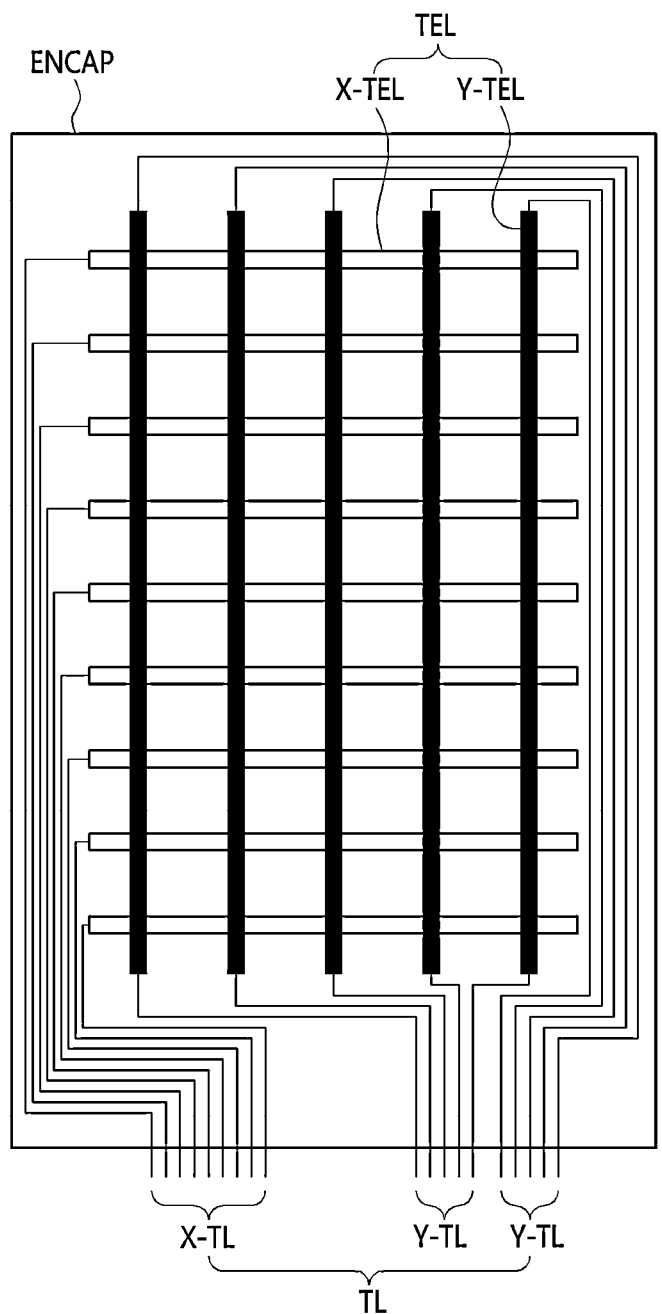
FIG. 3 is a diagram briefly illustrating a touch electrode structure for mutual capacitance-based touch sensing operation in a touch display device according to embodiments of the disclosure.

FIG. 3 is a diagram briefly illustrating a touch electrode structure for mutual capacitance-based touch sensing operation in a touch display device according to embodiments of the disclosure.

Referring to FIG. 3, a touch electrode structure for mutual capacitance-based touch sensing operation in the touch display device 100 according to embodiments of the disclosure may include a plurality of X-touch electrode lines X-TEL and a plurality of Y-touch electrode lines Y-TEL. The plurality of X-touch electrode lines X-TEL and the plurality of Y-touch electrode lines Y-TEL are located on the encapsulation layer ENCAP, but embodiments of the disclosure are not limited thereto.

The plurality of X-touch electrode lines X-TEL each may be disposed in a first direction, and the plurality of Y-touch electrode lines Y-TEL each may be disposed in a second direction different from the first direction.

In the disclosure, the first direction and the second direction may be relatively different directions. As an example, the first direction may be the x-axis direction, and the second direction may be the y-axis direction. In contrast, the first direction may be the y-axis direction, and the second direction may be the x-axis direction. The first direction and the second direction may be, or may not be, perpendicular to each other. In the disclosure, row and column are relative terms, and from a point of view, the terms "row" and "column" may be interchangeably used.

Each of the X-touch electrode lines X-TEL may be constituted of a plurality of X-touch electrodes electrically connected with each other. Each of the Y-touch electrode lines Y-TEL may be constituted of a plurality of Y-touch electrodes electrically connected with each other.

The plurality of X-touch electrodes and the plurality of Y-touch electrodes are included in the plurality of touch electrodes TE and whose roles (functions) are distinguished.

For example, the plurality of X-touch electrodes respectively constituting the plurality of X-touch electrode lines X-TEL may be driving touch electrodes, and the plurality of Y-touch electrodes respectively constituting the plurality of Y-touch electrode lines Y-TEL may be sensing touch electrodes. In this case, the plurality of X-touch electrode lines X-TEL respectively correspond to driving touch electrode lines, and the plurality of Y-touch electrode lines Y-TEL respectively correspond to sensing touch electrode lines.

Conversely, the plurality of X-touch electrodes respectively constituting the plurality of X-touch electrode lines X-TEL may be sensing touch electrodes, and the plurality of Y-touch electrodes respectively constituting the plurality of Y-touch electrode lines Y-TEL may be driving touch electrodes. In this case, the plurality of X-touch electrode lines X-TEL respectively correspond to sensing touch electrode lines, and the plurality of Y-touch electrode lines Y-TEL respectively correspond to driving touch electrode lines.

A touch sensor metal for touch sensing may include a plurality of touch lines TL as well as the plurality of X-touch electrode lines X-TEL and the plurality of Y-touch electrode lines Y-TEL.

The plurality of touch lines TL may include one or more X-touch lines X-TL respectively connected to the plurality of X-touch electrode lines X-TEL and one or more Y-touch lines Y-TL respectively connected to the plurality of Y-touch electrode lines Y-TEL.

Figure 4:
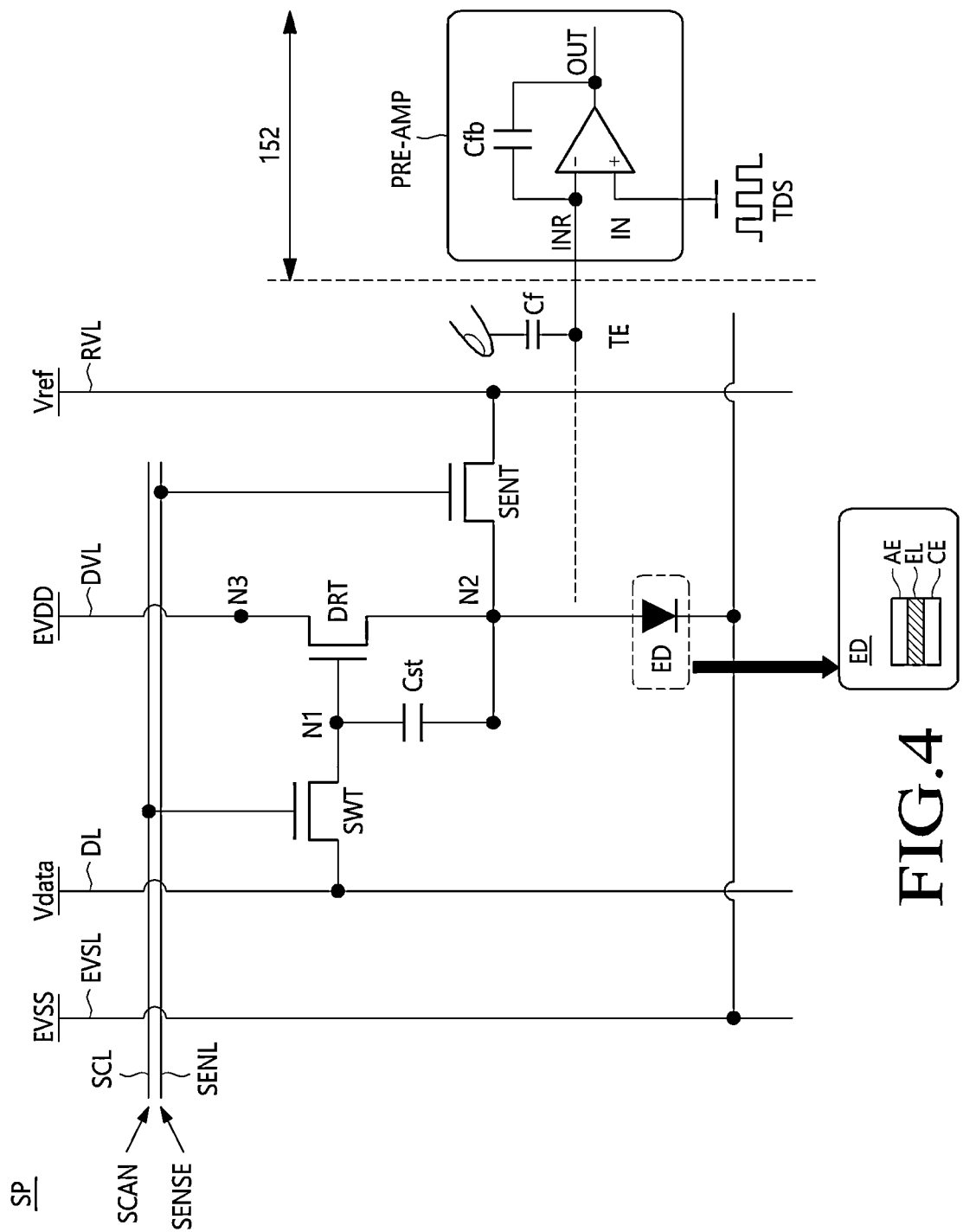
FIG. 4 is a view illustrating an example equivalent circuit of a subpixel constituting a display panel in a touch display device according to embodiments of the disclosure.

FIG. 4 is a view illustrating an example equivalent circuit of a subpixel constituting a display panel in a touch display device according to embodiments of the disclosure.

Referring to FIG. 4, each of the plurality of subpixels SP in the touch display device 100 according to embodiments of the disclosure may include a light emitting element ED, a driving transistor DRT for driving the light emitting element ED, a switching transistor SWT for switching an electrical connection between the gate electrode of the driving transistor DRT and a data line DL, and a storage capacitor Cst electrically connected between the gate electrode of the driving transistor DRT and the source electrode or drain electrode of the driving transistor DRT.

The gate electrode of the driving transistor DRT corresponds to the first node N1. The source electrode or drain electrode of the driving transistor DRT corresponds to the second node N2. The drain electrode or source electrode of the driving transistor DRT corresponds to the third node N3.

The light emitting element ED may include an anode electrode AE, a light emitting layer EL, and a cathode electrode CE. The light emitting layer EL may be positioned on the cathode electrode CE, and the anode electrode AE may be positioned on the light emitting layer EL. For example, the light emitting element ED is a device for a self-luminous display, and may include an organic light emitting diode (OLED), a light emitting element formed of a quantum dot, or a micro light emitting diode (micro LED).

The anode electrode AE may be referred to as a pixel electrode, and the cathode electrode CE may be referred to as a common electrode.

The drain electrode or source electrode of the switching transistor SWT may be electrically connected to the data line DL. The source electrode or drain electrode of the switching transistor SWT may be electrically connected to the gate electrode of the driving transistor DRT at the first node N1. The gate electrode of the switching transistor SWT may be electrically connected to the scan signal line SCL, which is a type of gate line GL. The on/off of the switching transistor SWT may be controlled by the scan signal SCAN supplied from the scan signal line SCL.

The storage capacitor Cst may be electrically connected between the first node N1 and the second node N2. The storage capacitor Cst may serve to maintain a voltage difference between the first node N1 and the second node N2 for a predetermined period of time (e.g., one frame time). The storage capacitor Cst is not an internal capacitor (parasitic capacitor) of the driving transistor DRT, but an external capacitor intentionally designed to drive the subpixel SP.

It has been described above that each subpixel SP includes a light emitting element ED, two transistors DRT and SWT, and one capacitor Cst, but each subpixel SP may further include one or more transistors and, in some cases, may further include one or more capacitors.

For example, as illustrated in FIG. 4, each subpixel SP may further include a sensing transistor SENT for controlling the connection between the second node N2 and the reference voltage line RVL.

The drain electrode or source electrode of the sensing transistor SENT may be electrically connected to the reference voltage line RVL. The source electrode or drain electrode of the sensing transistor SENT may be electrically connected to the source electrode or drain electrode of the driving transistor DRT at the second node N2 and may also be electrically connected to the anode electrode AE. The gate electrode of the sensing transistor SENT may be electrically connected to the sense signal line SENL, which is a type of gate line GL. The on/off of the sensing transistor SENT may be controlled by the sense signal SENSE supplied from the sense signal line SENL.

The anode electrode AE may be disposed in each of a plurality of subpixels SP, and may be electrically connected to the source electrode or drain electrode of the driving transistor DRT. In other words, at the second node N2, the anode electrode AE may be electrically connected to the source electrode or drain electrode of the driving transistor DRT.

The third node N3 of the driving transistor DRT may be electrically connected to the driving voltage line DVL supplying a high-level driving voltage EVDD, and may be a drain electrode or a source electrode.

At this time, the high-level driving voltage EVDD required to display the image may be supplied through the driving voltage line DVL during the display driving period. For example, the high-level driving voltage EVDD required to display the image may be 27V.

The driving transistor DRT may be turned on by the voltage difference between the first node N1 and the third node N3, and may supply a driving current to the light emitting element ED.

The cathode electrode CE may be commonly disposed in a plurality of subpixels SP. A direct current (DC)-level base voltage EVSS having no voltage level change may be applied to the cathode electrode CE. Here, the base voltage EVSS may correspond to a common voltage commonly applied to light emitting elements ED of all the subpixels SP.

In the touch display device 100 according to embodiments of the disclosure, the display panel 110 may further include a plurality of base voltage lines EVSL electrically connected to the cathode electrode CE.

When the plurality of base voltage lines EVSL are used, the base voltage EVSS may be uniformly supplied to the entire area of the cathode electrode CE. The method of supplying the base voltage EVSS using the plurality of base voltage lines EVSL may have an effect of efficiently supplying the base voltage EVSS when a large-area cathode electrode CE is provided due to the large-area display panel 110.

The touch driving circuit 152 may include one or more pre-amplifiers PRE-AMP. The pre-amplifier PRE-AMP may include a non-inverting input terminal IN to which the touch driving signal TDS is input, an inverting input terminal INR electrically connected to the touch electrode TE, an output terminal OUT to output an output signal, and a feedback capacitor Cfb connected between the non-inverting input terminal IN and the output terminal OUT.

The touch display device 100 according to embodiments of the disclosure may provide a touch display device and a display panel capable of simplifying the manufacturing process and reducing manufacturing costs by forming a partial area of the touch electrode TE to be overlapped with a partial area of the anode electrode AE at the top or bottom of the anode electrode AE.

Accordingly, the inverting input terminal INR of the pre-amplifier PRE-AMP may be electrically connected to the touch electrode TE formed at the position overlapped the partial area of the anode electrode AE of the light emitting element ED.

The touch driving signal TDS applied to the non-inverting input terminal IN of the pre-amplifier PRE-AMP may be a signal whose voltage level is varied and may have a predetermined frequency and amplitude.

When the user touches the screen with a finger or pen, a capacitance Cf may be formed between the touch electrode TE and the finger or pen. The capacitance Cf is called a finger capacitance Cf.

This touch display device 100 may be employed in mobile devices such as smartphones and tablet PCs, and automotive displays. In this case, the touch display device 100 may use an antenna to communicate with other devices.

At this time, a performance of transmitting and receiving wireless signals and a performance of touch sensing in the touch display device 100 using an antenna performs wireless signal may be degraded due to electromagnetic interference with the touch driving signals transmitted through the touch electrode line TEL in the process of transmitting and receiving wireless signals in a high frequency band.

In order to solve this problem, the touch display device 100 of the disclosure may include pseudo touch electrode lines disposed in the non-display area NDA capable of reducing the electromagnetic noise caused by wireless signals, etc.

Figure 5:
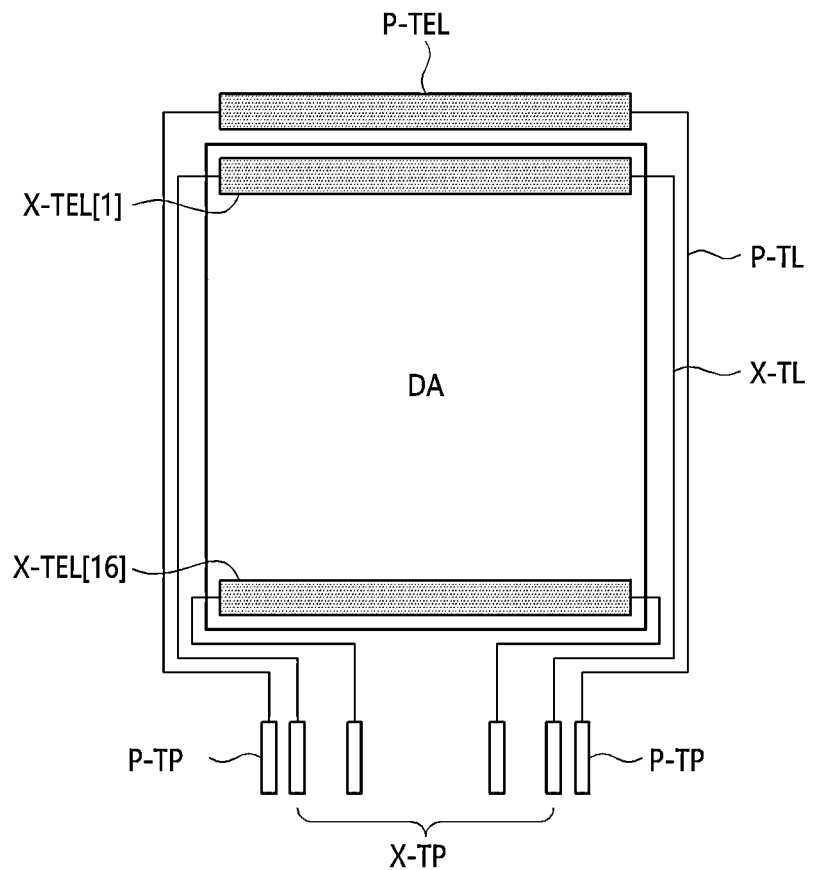
FIG. 5 is a diagram illustrating a structure in which pseudo touch electrode lines are arranged in a touch display device according to embodiments of the disclosure.

FIG. 5 is a diagram illustrating a structure in which pseudo touch electrode lines are arranged in a touch display device according to embodiments of the disclosure.

Referring to FIG. 5, the touch display device 100 according to embodiments of the disclosure may include a plurality of X-touch electrode lines X-TEL and a plurality of Y-touch electrode lines Y-TEL disposed in the display area DA of the display panel 110, and at least one pseudo touch electrode line P-TEL disposed in the non-display area NDA.

Here, for convenience of explanation, FIG. 5 illustrates a case that 16 X-touch electrode lines X-TEL[1]~X-TEL[16] supplying touch driving signals are disposed in the first direction in the display area DA, and the pseudo touch electrode line P-TEL is disposed in a direction parallel to the X-touch electrode line X-TEL in the non-display area NDA.

Each of the 16 X-touch electrode lines X-TEL[1]~X-TEL[16] is electrically connected to the corresponding X-touch pad X-TP through an X-touch line X-TL. In other words, an X-touch electrode X-TE disposed on the outermost side of the plurality of X-touch electrodes X-TE included in a X-touch electrode line X-TEL may be electrically connected to the corresponding X-touch pad X-TP through an X-touch line X-TL.

One or more pseudo touch electrode lines P-TEL may be disposed in a direction parallel to the X-touch electrode lines X-TEL[1]~X-TEL[16] transmitting the touch driving signals in the non-display area NDA. At this time, a pseudo touch electrode line P-TEL may be electrically connected to the corresponding pseudo touch pad P-TP through a pseudo touch line P-TL.

At this time, when a pseudo touch driving signal with a phase opposite to the touch driving signal supplied to the plurality of X-touch electrode lines X-TEL[1]~X-TEL[16] is applied to the pseudo touch electrode line P-TEL in the non-display area NDA, electromagnetic interference caused by the touch driving signal may be reduced.

At this time, one pseudo touch electrode line P-TEL may be connected to one pseudo touch line P-TL. On the other hand, electromagnetic noise caused by wireless signals, etc. may be effectively reduced by connecting a plurality of pseudo touch electrode lines P-TEL spaced apart at certain distances to one pseudo touch line P-TL.

Figure 6:
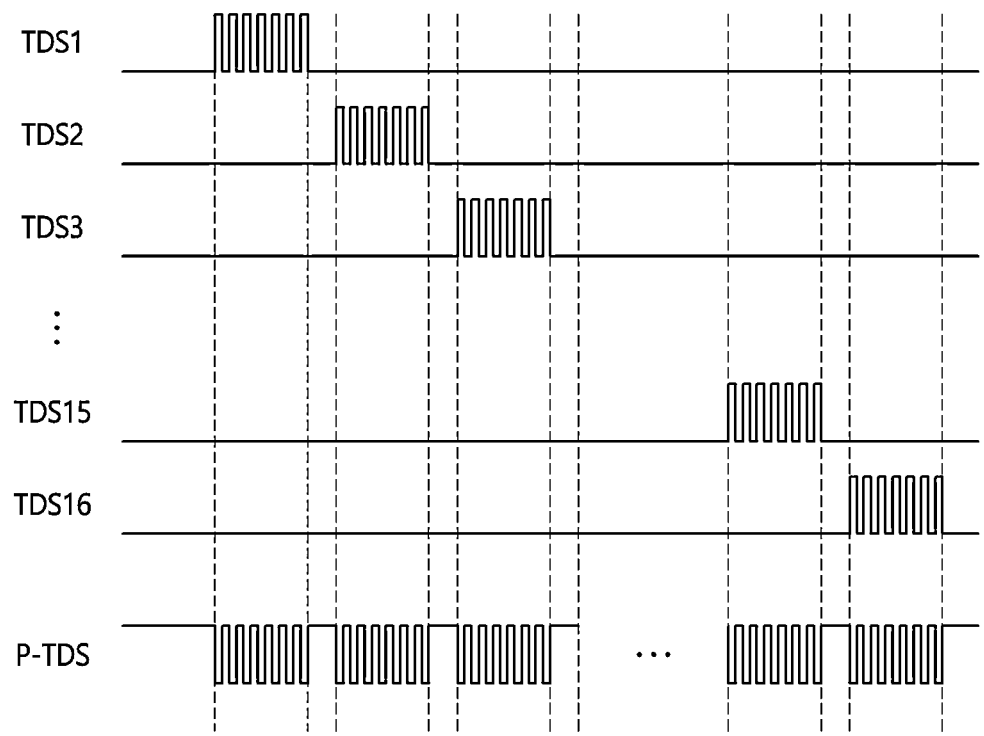
FIG. 6 is a diagram illustrating the waveforms of touch driving signals supplied to a plurality of touch electrode lines and a pseudo touch driving signal supplied to a pseudo touch electrode line in a touch display device according to embodiments of the disclosure.

FIG. 6 is a diagram illustrating the waveforms of touch driving signals supplied to a plurality of touch electrode lines and a pseudo touch driving signal supplied to a pseudo touch electrode line in a touch display device according to embodiments of the disclosure.

Referring to FIG. 6, a plurality of X-touch electrode lines X-TEL may be disposed in the display area DA of the display panel 110 in the touch display device 100 according to embodiments of the disclosure. Here, it illustrates an example where 16 X-touch electrode lines X-TEL[1]~X-TEL[16] are arranged.

When 16 X-touch electrode lines X-TEL[1]~X-TEL[16] are disposed in the display area DA of the display panel 110, 16 pulse-type touch driving signals TDS1-TDS16 may be supplied to each of the 16 X-touch electrode lines X-TEL[1]~X-TEL[16] at different times.

At this time, a pseudo touch driving signal P-TDS with a phase opposite to the touch driving signals TDS1~TDS16 may be supplied to the pseudo touch electrode line P-TEL.

Here, it illustrates a case that one pseudo touch line P-TL or one pseudo touch electrode line P-TEL corresponds to 16 X-touch electrode lines X-TEL[1]~X-TEL[16] as an example. The number of pseudo touch lines P-TL or pseudo touch electrode lines P-TEL may be changed in various ways.

In this way, when a pseudo touch driving signal P-TDS with a phase opposite to the touch driving signals TDS1~TDS16 transmitted through a plurality of X-touch electrode lines X-TEL[1]~X-TEL[16] is transmitted through the pseudo touch electrode line P-TEL located in the non-display area NDA, electromagnetic noise caused by the touch driving signals may be reduced.

Figure 7:
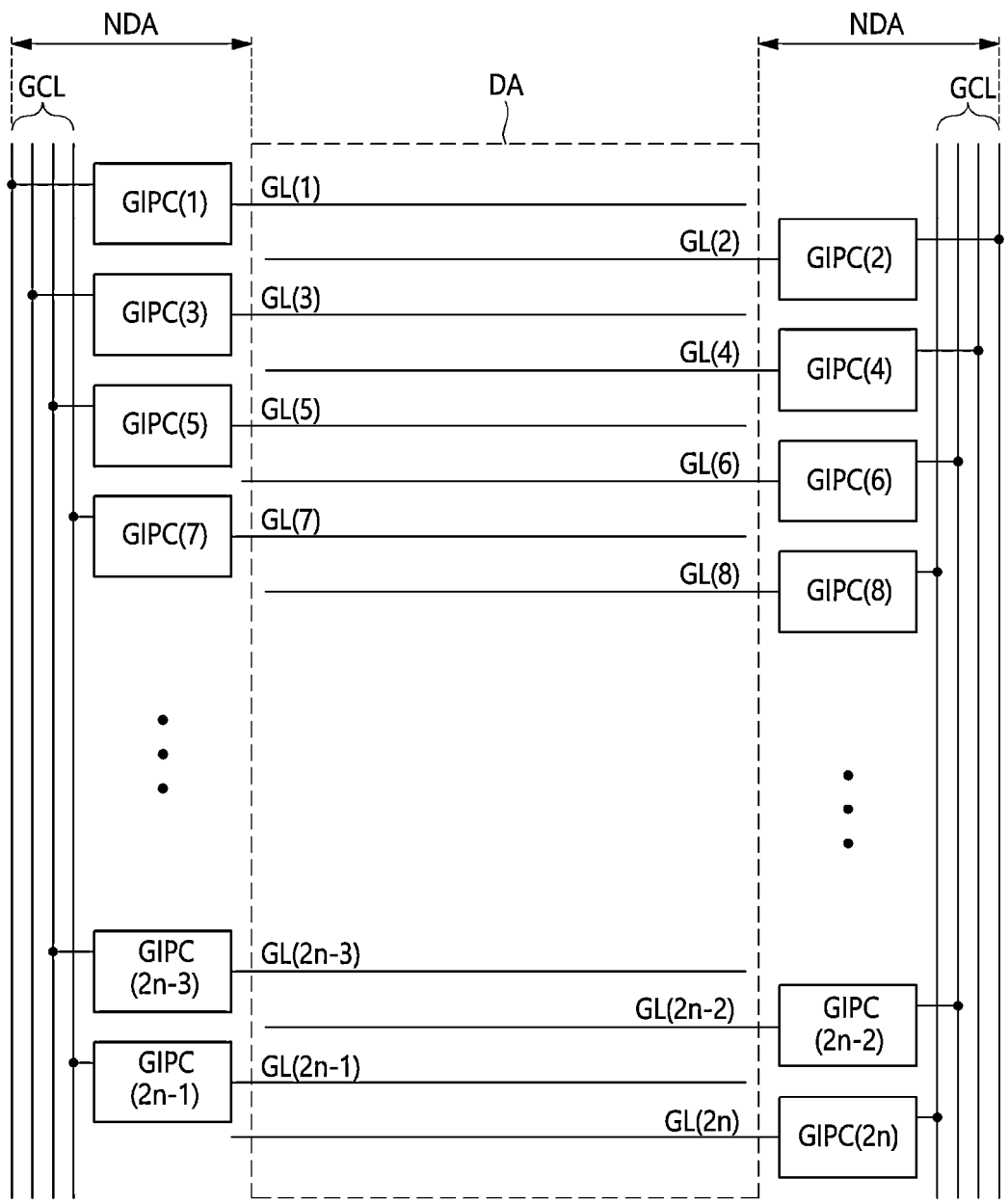
FIG. 7 is a diagram illustrating an example of a display panel in which a gate driving circuit is implemented in a GIP type in a touch display device according to embodiments of the disclosure.

FIG. 7 is a diagram illustrating an example of a display panel in which a gate driving circuit is implemented in a GIP type in a touch display device according to embodiments of the disclosure.

Referring to FIG. 7, the touch display device 100 according to embodiments of the disclosure may include 2n gate lines GL(1)~GL(2n) (where n is a natural number) disposed in the display area DA for displaying an image in the display panel 110.

Here, the display area DA is an area for displaying an image through a plurality of subpixels SP to emit light of corresponding colors, for example, white subpixel, red subpixel, green subpixel, and blue subpixel. In addition, a plurality of dummy pixels that do not emit light because the gate signal or data voltage Vdata are not supplied, but have a load similar to that of the subpixel SP may be disposed in some locations of the display area DA.

In embodiments of the disclosure, a plurality of subpixel areas emitting light of a corresponding color and an area including dummy pixels not emitting light may be referred to as a display area DA. Alternatively, it may be referred to as a pixel array, including a plurality of subpixel areas emitting light of the corresponding color and an area where dummy pixels not emitting light are disposed.

The gate driving circuit 120 may include 2n GIP circuits GIPC corresponding to 2n gate lines GL(1)~GL(2n) and may be disposed in the non-display area NDA not including a pixel in outer area of the display area DA.

Accordingly, the 2n GIP circuits GIPC may supply the gate signals to the 2n gate lines GL(1)~GL(2n).

As such, when the gate driving circuit 120 is implemented in a GIP type, it is not necessary to form a separate integrated circuit having a gate driving function and bond it to the display panel 110. Thus, it is possible to reduce the number of integrated circuits and omit the process of connecting the integrated circuits to the display panel 110. It is also possible to reduce the size of the non-display area NDA for bonding the integrated circuit in the display panel 110.

The 2n GIP circuits GIPC may be denoted as GIPC(1), GIPC(2), . . . . GIPC(2n) to be distinguished from each other and to identify a correspondence relationship between the 2n gate lines GL(1)~GL(2n).

In here, it illustrates an example in which the 2n GIP circuits GIPC(1)~GIPC(2n) are disposed on both sides of the non-display area NDA. For example, among the 2n GIP circuits GIPC(1)~GIPC(2n), the odd-numbered GIP circuits GIPC(1), GIPC(3), . . . , GIPC(2n−1) may drive the odd-numbered gate line GL(1), GL(3), . . . , GL(2n−1). Among the 2n GIP circuits GIPC(1)~GIPC(2n), the even-numbered GIP circuits GIPC(2), GIPC(4), . . . , GIPC(2n) may drive the even-numbered gate lines GL(2), GL(4), . . . , GL(2n).

Alternatively, the 2n GIP circuits GIPC(1)~GIPC(2n) may be disposed on only one side of the non-display area NDA.

A plurality of gate clock signal lines GCL to transmit gate clocks necessary for generating and outputting the gate signals to the gate driving circuit 120 may be disposed in the non-display area NDA not including pixels in the outer portion of the display area DA of the display panel 110.

The gate signal generated in the GIP circuit GIPC may include a scan signal, a sense signal, or an emission signal, depending on the circuit structure of the subpixel.

Figure 8:
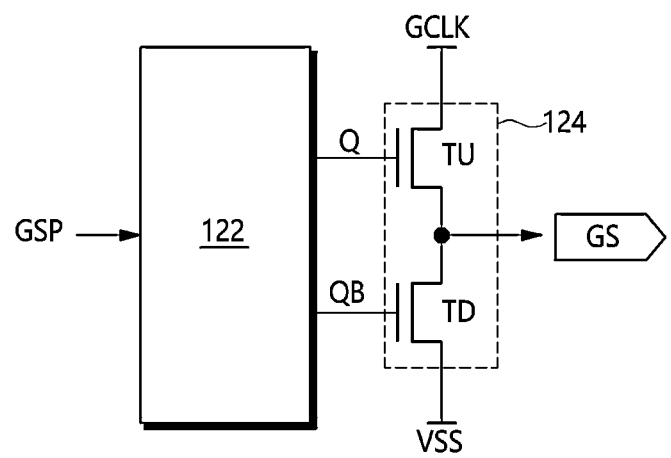
FIG. 8 is a block diagram schematically illustrating a configuration of a GIP circuit in a touch display device according to embodiments of the disclosure.

FIG. 8 is a block diagram schematically illustrating a configuration of a GIP circuit in a touch display device according to embodiments of the disclosure.

Referring to FIG. 8, one GIP circuit GIPC in the touch display device 100 according to embodiments of the disclosure may include a shift register 122 and a buffer circuit 124.

The GIP circuit GIPC starts to operate according to the gate start pulse GSP and outputs the gate signal GS according to the gate clock GCLK. The gate signal GS generated in the GIP circuit GIPC is sequentially shifted and supplied through the gate line GL.

The buffer circuit 124 has two nodes Q and QB that are important to the gate driving state and may include a pull-up transistor TU and a pull-down transistor TD. The gate node of the pull-up transistor TU may correspond to the Q node, and the gate node of the pull-down transistor TD may correspond to the QB node.

The shift register 122 may also be referred to as a shift logic circuit and may be used to generate the gate signal GS in synchronization with the gate clock GCLK.

The shift register 122 may control the Q node and the QB node connected to the buffer circuit 124 so that the buffer circuit 124 may output the gate signal GS and, to this end, may include a plurality of transistors.

The shift register 122 starts to generate the gate signal GS, and the output of the shift register 122 is sequentially turned on according to the gate clock GCLK. In other words, it is possible to transfer the logic state for sequentially determining on/off of the gate line GL by controlling the output time of the shift register 122 using the gate clock GCLK.

According to the shift register 122, the respective voltage states of the Q node and the QB node of the buffer circuit 124 may be different. Accordingly, the buffer circuit 124 may output a high-level gate voltage VGH for turning on the corresponding gate line GL to the corresponding gate line GL or a low-level gate voltage VGL for turning off the corresponding gate line GL to the corresponding gate line GL.

Meanwhile, one GIP circuit GIPC may further include a level shifter in addition to the shift register 122 and the buffer circuit 124.

In this case, the shift register 122 and the buffer circuit 124 constituting the GIP circuit GIPC may be connected in various structures.

Figure 9:
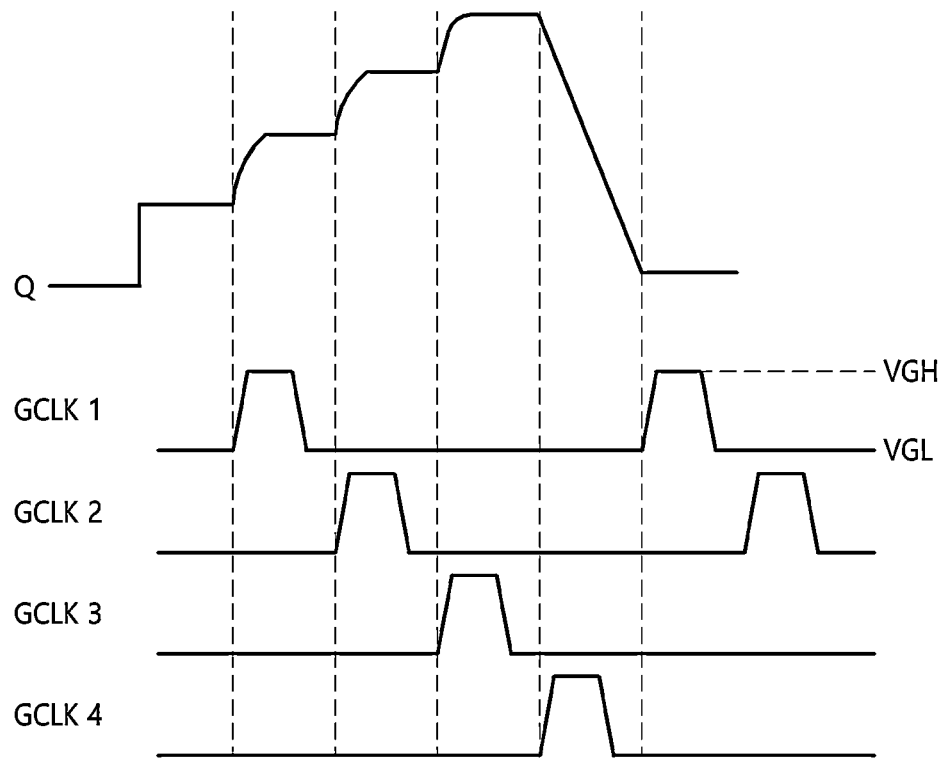
FIG. 9 is a diagram illustrating signal waveforms of the Q node voltage of the shift register depending on a gate clock in a touch display device according to embodiments of the disclosure.

FIG. 9 is a diagram illustrating signal waveforms of the Q node voltage of the shift register depending on a gate clock in a touch display device according to embodiments of the disclosure.

Referring to FIG. 9, in the GIP circuit GIPC of the touch display device 100 according to embodiments of the disclosure, when a first gate clock GCLK1 is supplied to the buffer circuit 124 in a state that the Q node of the shift register 122 is charged by the high-level gate voltage VGH, the voltage of the floated Q node is bootstrapped and the high-level gate voltage VGH of the pull-up transistor TU is further increased.

In this case, the first gate signal supplied from the buffer circuit 124 to the first gate line GL1 may be maintained at the same level as the first gate clock GCLK1.

At this time, when the second gate clock GCLK2 is supplied to the adjacent buffer circuit 124, the voltage of the Q node further increases. As a result, the second gate signal supplied from the adjacent buffer circuit 124 to the second gate line may be increased to a level higher than the Q node voltage of the previous stage.

In a case of n-phase driving operation, which supplies gate signals sequentially for n gate lines GL(1)~GL(n), the level of each gate signals supplied to the first gate line GL(1) to nth gate line GL(n) may be different values due to voltage variation at the Q node.

In addition, a capacitance may occur during the transition of the gate clocks GCLK1~GCLKn transmitted through the gate clock lines GCL and a noise caused by an electromagnetic interference may occur between adjacent gate lines GL.

To solve this problem, at least one pseudo gate clock line may be disposed in the non-display area NDA and a pseudo gate clock capable of reducing electromagnetic noise caused by the gate clock GCLK may be supplied.

Figure 10:
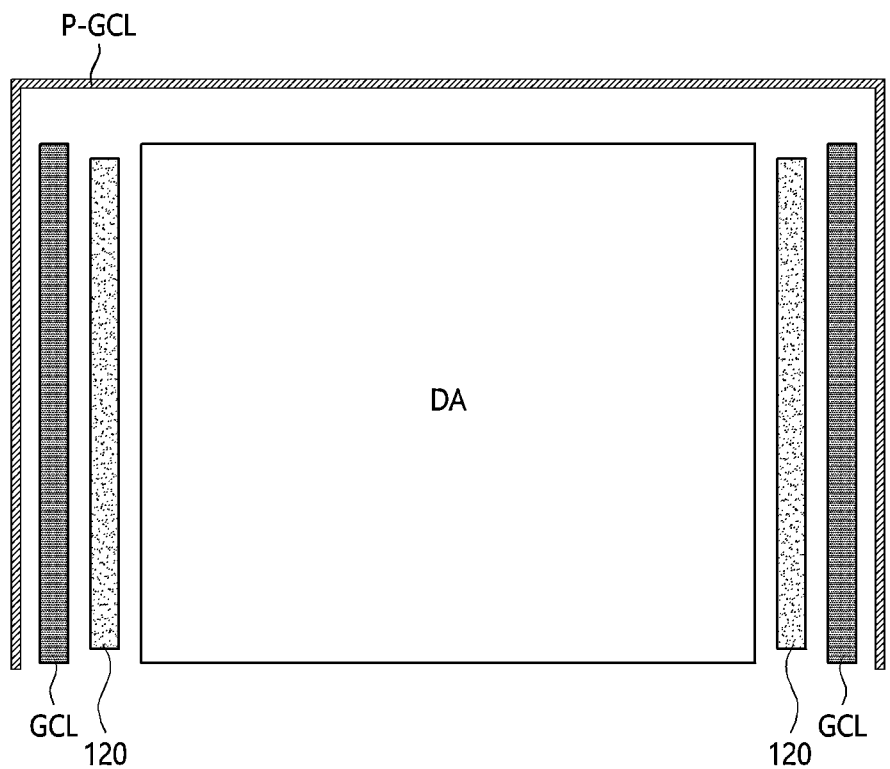
FIG. 10 is a diagram illustrating an example of a pseudo gate clock line being formed along a non-display area in a touch display device according to embodiments of the disclosure.

FIG. 10 is a diagram illustrating an example of a pseudo gate clock line being formed along a non-display area in a touch display device according to embodiments of the disclosure.

Referring to FIG. 10, a gate driving circuit 120 supplying a gate signal to the display panel 110 may be disposed outside the display area DA formed in the display panel 110 of the touch display device 100 according to embodiments of the present disclosure.

A plurality of gate clock lines GCL that transmit the gate clock GCLK required for generating the gate signal to the gate driving circuit 120 may be disposed in the non-display area NDA where pixels are not formed in the display panel 110.

In addition, a pseudo gate clock line P-GCL may be disposed outside the gate clock line GCL to supply a pseudo gate clock with a phase opposite to that of the gate clock GCLK.

The pseudo gate clock line P-GCL may be arranged in parallel to the gate clock line GCL along the outside of the gate clock line GCL and may form a closed loop connected along the upper side of the display panel 110.

Therefore, when a pseudo gate clock with a phase opposite to the gate clock GCLK is supplied along the pseudo gate clock line P-GCL in a period where the gate clock GCLK is supplied along the gate clock line GCL, the electromagnetic noise caused by the gate clock GCLK may be reduced.

Figure 11:
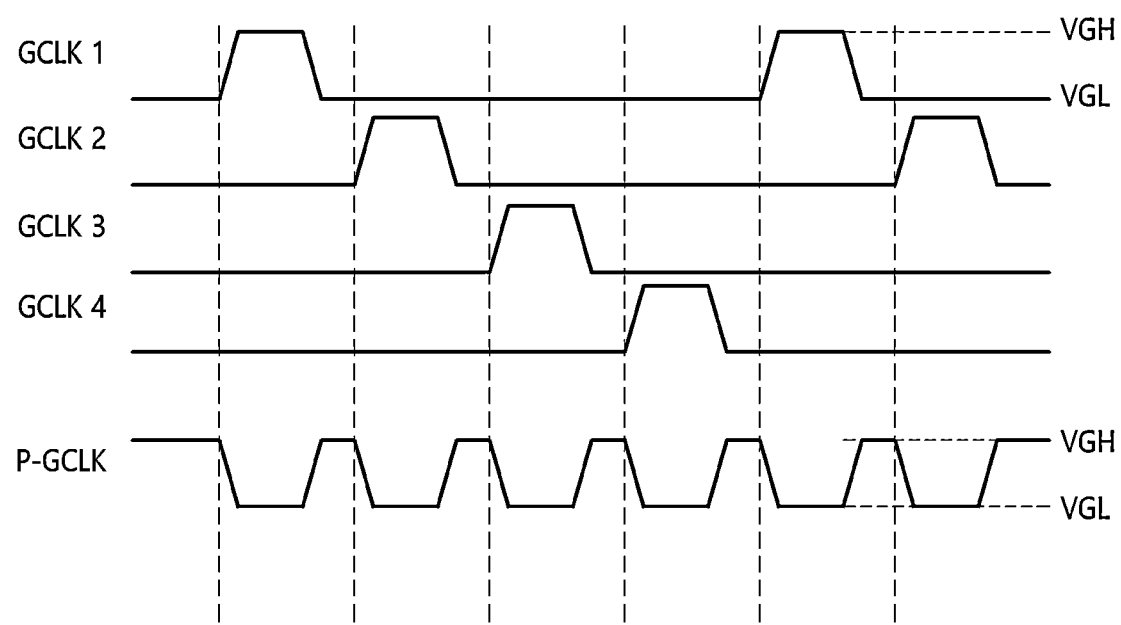
FIG. 11 is a diagram illustrating the waveforms of gate clocks and a pseudo gate clock in a touch display device according to embodiments of the disclosure.

FIG. 11 is a diagram illustrating the waveforms of gate clocks and a pseudo gate clock in a touch display device according to embodiments of the disclosure.

Here, it illustrates an example where four gate clock lines GCL and one pseudo gate clock line P-GCL are disposed in the non-display area NDA.

Referring to FIG. 11, the touch display device 100 according to embodiments of the disclosure may include a pseudo gate clock line P-GCL disposed along outside of the gate clock line GCL located in the non-display area NDA.

When the gate clock GCLK is supplied through the gate clock line GCL during the display driving period, electromagnetic noise caused by the gate clock GCLK may be reduced by supplying a pseudo gate clock P-GCLK with a phase opposite to the gate clock GCLK to the pseudo gate clock line P-GCL.

For example, four gate clocks GCLK1-GCLK4 supplied through four gate clock lines GCL may form pulses at different times. Therefore, a pseudo gate clock P-GCLK with a phase opposite to that of the four gate clocks GCLK1-GCLK4 may be supplied through the pseudo gate clock line P-GCL.

Here, it illustrates an example where one pseudo gate clock P-GCLK corresponds to four gate clocks GCLK1-GCLK4, and the number of pseudo gate clock lines P-GCL may be determined in various ways.

In this way, the touch display device 100 of the disclosure may supply a pseudo touch driving signal with a phase opposite to that of the touch driving signals TDS through the pseudo touch line P-TL during the touch driving period when the touch driving signals TDS are supplied. In addition, the touch display device 100 of the disclosure may supply a pseudo gate clock P-GCLK with a phase opposite to the gate clock GCLK through the pseudo gate clock line P-GCL during the display driving period when the gate clocks GCLK are supplied. As a result, the touch display device 100 of the disclosure may reduce electromagnetic noise caused by the touch driving signals TDS and gate clocks GCLK.

Figure 12:
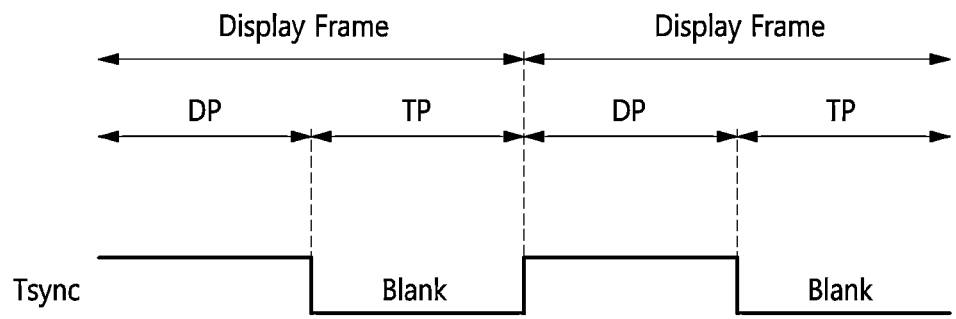
FIG. 12 is a timing diagram illustrating a display driving period and a touch driving period in a touch display device according to embodiments of the disclosure.

FIG. 12 is a timing diagram illustrating a display driving period and a touch driving period in a touch display device according to embodiments of the disclosure.

Referring to FIG. 12, the touch display device 100 according to embodiments of the disclosure may perform a display driving operation for image display during a predetermined display driving period DP and may perform a touch driving operation for sensing a touch input by a finger or a stylus during a predetermined touch driving period TP.

The display driving period DP and the touch driving period TP may be temporally identical or overlap each other or be temporally separated periods.

When the display driving period DP and the touch driving period TP are temporally identical, the display driving operation and the touch driving operation may be performed simultaneously.

Here, it illustrates a case of time-division driving operation in which the display driving period DP and the touch driving period TP are separated in time. In this case, the display driving period DP and the touch driving period TP may alternate.

As such, when the display driving period DP and the touch driving period TP are temporally separated while alternating, the touch driving period TP may correspond to a blank period when display driving is not performed.

The touch display device 100 may generate a touch synchronization signal Tsync swinging to a high level and a low level, thereby identifying or controlling the display driving period DP and the touch driving period TP. In other words, the touch synchronization signal Tsync may be a timing control signal defining the touch driving period TP.

For example, a high-level period (or a low-level period) of the touch synchronization signal Tsync may correspond to the display driving period DP, and the low-level period (or high-level period) of the touch synchronization signal Tsync may correspond to the touch driving period TP.

In relation to the scheme of allocating the display driving period DP and the touch driving period TP within one display frame period, one display frame period may be divided into one display driving period DP and one touch driving period TP, and display driving operation may be performed during one display driving period DP and touch driving operation for sensing the touch input by the passive stylus and the active stylus may be performed during one touch driving period TP which corresponds to a blank period Blank.

As another example, one display frame period may be divided into two or more display driving periods DP and two or more touch driving periods TP. The display driving operation may be performed during two or more display driving periods DP within one display frame period, and the touch driving operation for sensing one or two or more touch inputs by the passive stylus and the active stylus in the whole or part of the screen may be performed during two or more touch driving periods TP.

As such, when one display frame period is divided into two or more display driving periods DP and two or more touch driving periods TP, and display driving and touch driving are performed, each of two or more blank periods corresponding to two or more touch driving periods TP within one display frame period is referred to as a long horizontal blank (LHB).

Accordingly, two or more periods when touch sensing of a stylus or a finger is performed within the display frame period may be referred to as an LHB or touch driving period TP, and the touch driving operation performed during two or more LHBs within one display frame period may be referred to as "LHB driving operation."

Figure 13:
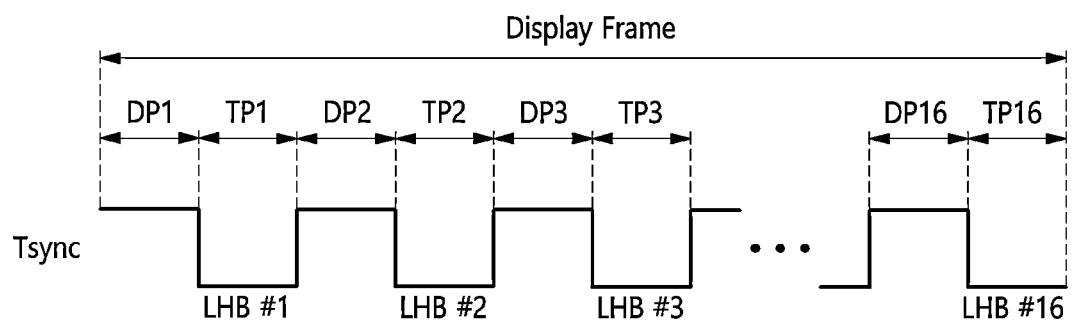
FIG. 13 is a diagram illustrating a timing of one display frame period being time-divided into a plurality of display driving periods and a plurality of touch driving periods in a touch display device according to embodiments of the disclosure.

FIG. 13 is a diagram illustrating a timing of one display frame period being time-divided into a plurality of display driving periods and a plurality of touch driving periods in a touch display device according to embodiments of the disclosure.

Referring to FIG. 13, one display frame period in the touch display device 100 according to embodiments of the disclosure may be time-divided into 16 display driving periods DP1 to DP16 and 16 touch driving periods TP1-TP16.

In this case, the 16 touch driving periods TP1-TP16 may correspond to 16 LHB periods LHB1-LHB16.

The touch display device 100 according to embodiments of the disclosure may divide one display frame period into one or more display driving periods DP1 to DP16 and one or more touch driving periods TP1-TP16 to alternately perform display driving operation and touch driving operation.

Alternatively, the touch display device 100 according to embodiments of the disclosure may perform the touch driving period TP1-TP16 independently of the display driving period DP1-DP16.

Figure 14:
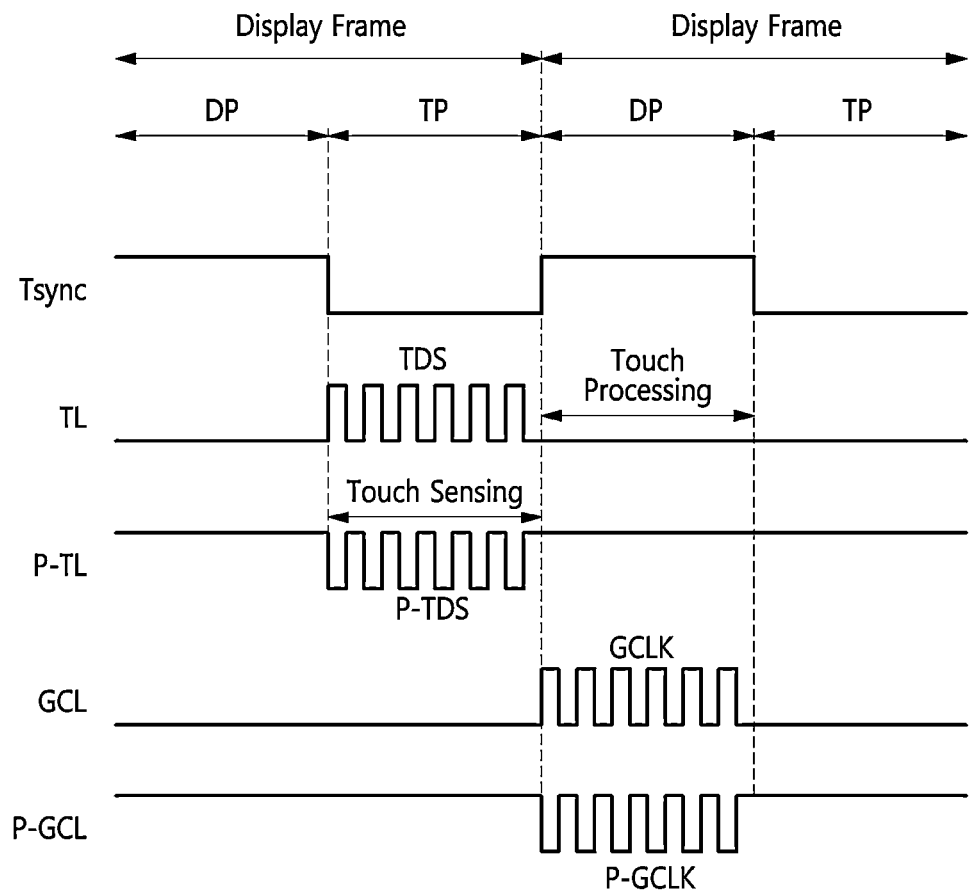
FIG. 14 illustrates a timing at which a pseudo touch driving signal and a pseudo gate clock are supplied in a case of time-division driving operation in which the display driving period and the touch driving period are timely divided in the touch display device according to embodiments of the disclosure.

FIG. 14 illustrates a timing at which a pseudo touch driving signal and a pseudo gate clock are supplied in a case of time-division driving operation in which the display driving period and the touch driving period are timely divided in the touch display device according to embodiments of the disclosure.

Referring to FIG. 14, the touch display device 100 according to embodiments of the disclosure may perform a display driving operation for displaying an image during a display driving period DP and performs a touch driving operation for sensing a touch input by a finger, etc., during a touch driving period TP within one display frame.

The display driving period DP may be distinguished from the touch driving period TP by the touch synchronization signal Tsync.

The touch circuit 150 may supply the touch driving signal TDS to the touch electrode line TEL through the touch line TL during the touch driving period TP, and receive a touch sensing signal from the touch electrode line TEL. This period may be called a touch sensing period. At this time, the pseudo touch driving signal P-TDS with a phase opposite to the touch driving signal TDS may be supplied through the pseudo touch line P-TL.

The touch circuit 150 may perform a touch processing operation by extracting touch coordinates through a calculation for a touch sensing signal received from the touch electrode line TEL, and transmitting the touch coordinates to the timing controller 140. This period may be called a touch processing period. At this time, the touch processing period may be included in the display driving period DP after the touch driving period TP. Therefore, the touch driving signal TDS and the pseudo touch driving signal P-TDS are not supplied to the touch electrode line TEL during the touch processing period.

That is, since the pseudo touch driving signal P-TDS is not supplied during the touch processing period when the touch processing operations occur within the display driving period DP, electromagnetic noise may be reduced by relying only on the pseudo gate clock P-GCLK transmitted through the pseudo gate clock line P-GCL.

However, since the number of signal lines placed in the non-display area NDA must be reduced in order to implement a narrow bezel, the number of pseudo gate clock lines P-GCL is limited.

Therefore, it may be difficult to reduce the electromagnetic noise generated during the display driving period DP by relying only on the pseudo gate clock P-GCLK supplied through the pseudo gate clock line P-GCL.

The touch display device 100 of the disclosure may reduce the electromagnetic noise generated during the display driving period DP by supplying the pseudo gate clock P-GCLK through the pseudo touch line P-TL during the touch processing period when the touch processing operation is performed within the display driving period DP.

Figure 15:
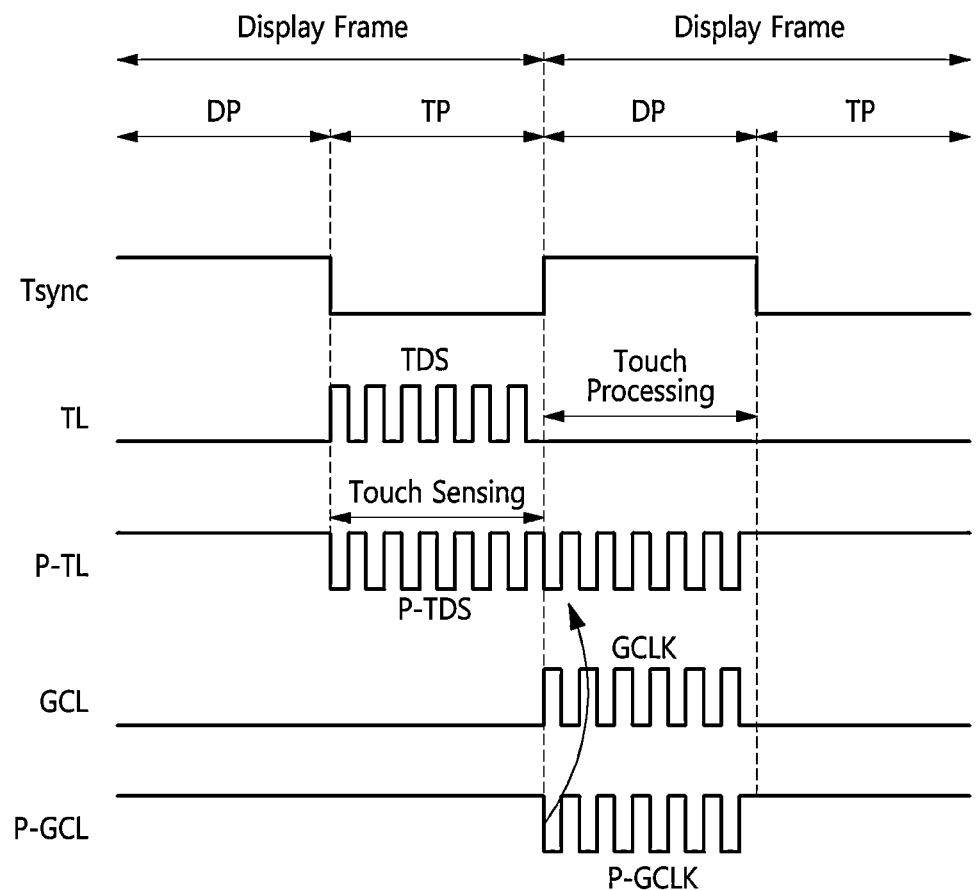
FIG. 15 is a diagram illustrating signal waveforms that a pseudo gate clock is supplied through a pseudo touch line during the touch processing period in a case of time-division driving operation in which the display driving period and the touch driving period are temporally separated in the touch display device according to embodiments of the disclosure.

FIG. 15 is a diagram illustrating signal waveforms that a pseudo gate clock is supplied through a pseudo touch line during the touch processing period in a case of time-division driving operation in which the display driving period and the touch driving period are temporally separated in the touch display device according to embodiments of the disclosure.

Referring to FIG. 15, the touch display device 100 according to embodiments of the disclosure may perform a display driving operation for displaying an image during a display driving period DP and a touch driving operation for sensing a touch input by a finger during the touch driving period TP within one display frame.

The display driving period DP may be distinguished from the touch driving period TP by the touch synchronization signal Tsync.

The touch circuit 150 may supply the touch driving signal TDS to the touch electrode line TEL through the touch line TL during the touch driving period TP, and receive a touch sensing signal from the touch electrode line TEL. This period may be called a touch sensing period. At this time, the pseudo touch driving signal P-TDS with a phase opposite to the touch driving signal TDS may be supplied through the pseudo touch line P-TL.

The touch circuit 150 may perform a touch processing operation by extracting touch coordinates through a calculation for a touch sensing signal received from the touch electrode line TEL, and transmitting the touch coordinates to the timing controller 140. This period may be called a touch processing period. At this time, the touch processing period may be included in the display driving period DP after the touch driving period TP. Therefore, the touch driving signal TDS are not supplied to the touch electrode line TEL during the touch processing period.

However, the pseudo gate clock P-GCLK supplied through the pseudo gate clock line P-GCL may also be supplied to the pseudo touch line P-TL during the touch processing period.

In this way, when the pseudo gate clock P-GCLK is supplied not only to the pseudo gate clock line P-GCL but also to the pseudo touch line P-TL during the touch processing period within the display driving period DP, the amount of reducing electromagnetic noise during the display driving period DP may be increased.

The touch display device 100 of the disclosure may be applied not only to time-division driving operation in which the display driving period and the touch driving period are temporally separated, but also to simultaneous driving operation in which the display driving period and the touch driving period proceed together.

Figure 16:
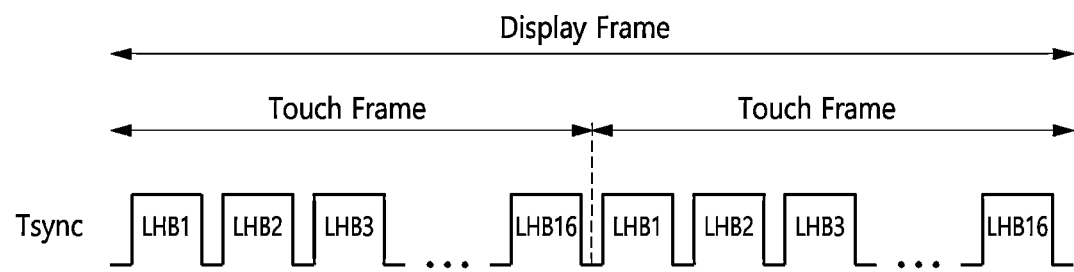
FIG. 16 is a diagram illustrating a case in which a display driving period and a touch driving period proceed simultaneously in a touch display device according to embodiments of the disclosure.

FIG. 16 is a diagram illustrating a case in which a display driving period and a touch driving period proceed simultaneously in a touch display device according to embodiments of the disclosure.

Referring to FIG. 16, the touch display device 100 according to embodiments of the disclosure may perform the display driving operation and the touch driving operation at different times, but may perform the display driving operation and the touch driving operation simultaneously.

In this case, the display frame period may overlap with the touch frame period.

Accordingly, the touch synchronization signal Tsync may distinguish and indicate only the touch driving period TP within a touch frame period. For example, 16 LHBs LHB1-LHB16 may be one touch frame period. Here, the touch frame period may mean a period in which a touch by a finger or stylus may be sensed once in the entire screen.

Here, it illustrates that the touch driving operation is performed in a high-level period of the touch synchronization signal Tsync, but the touch driving operation may be performed in a low-level period of the touch synchronization signal Tsync.

Additionally, a finger touch driving operation may be performed to sense a touch by a finger, or a pen touch driving operation may be performed to sense a touch by a stylus in the touch driving period LHB1-LHB16.

Figure 17:
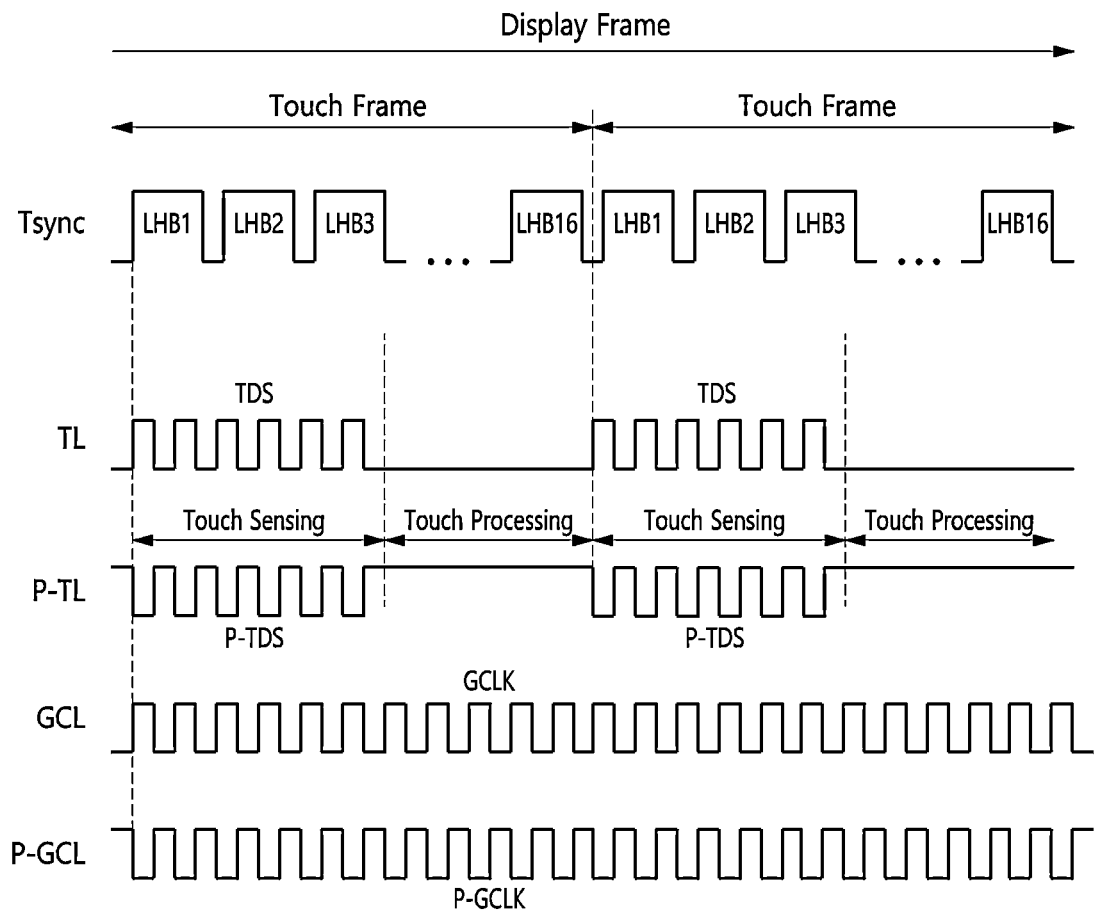
FIG. 17 is a diagram illustrating a timing at which a pseudo touch driving signal and a pseudo gate clock are supplied when the display driving period proceeds simultaneously with the touch driving period in the touch display device according to embodiments of the disclosure.

FIG. 17 is a diagram illustrating a timing at which a pseudo touch driving signal and a pseudo gate clock are supplied when the display driving period proceeds simultaneously with the touch driving period in the touch display device according to embodiments of the disclosure.

Referring to FIG. 17, a display frame period may overlap with a touch frame period in the touch display device 100 according to embodiments of the disclosure. At this time, the display driving operation in the display frame period may proceed independently from the touch driving operation in the touch frame period.

The touch circuit 150 may supply the touch driving signal TDS to the touch electrode line TEL through the touch line TL during some LHB within the touch frame period, and receive a touch sensing signal from the touch electrode line TEL. This period may be called a touch sensing period. At this time, the pseudo touch driving signal P-TDS with a phase opposite to the touch driving signal TDS may be supplied through the pseudo touch line P-TL.

The touch circuit 150 may perform a touch processing operation by extracting touch coordinates through a calculation for a touch sensing signal received from the touch electrode line TEL, and transmitting the touch coordinates to the timing controller 140. This period may be called a touch processing period. At this time, the touch processing period may be included in the some LHB within the touch frame period. Therefore, the touch driving signal TDS may not supplied to the touch electrode line TEL and the pseudo touch driving signal P-TDS may not supplied to the pseudo touch line P-TL during the touch processing period.

That is, since the pseudo touch driving signal P-TDS is not supplied during the touch processing period within the touch frame period, electromagnetic noise may be reduced by relying only on the pseudo gate clock P-GCLK transmitted through the pseudo gate clock line P-GCL.

However, since the number of signal lines placed in the non-display area NDA must be reduced in order to implement a narrow bezel, the number of pseudo gate clock lines P-GCL is limited.

Therefore, it may be difficult to reduce the electromagnetic noise generated during the touch frame period by relying only on the pseudo gate clock P-GCLK supplied through the pseudo gate clock line P-GCL.

The touch display device 100 of the disclosure may increase an amount of reducing the electromagnetic noise generated by supplying the pseudo gate clock P-GCLK through the pseudo touch line P-TL during the touch processing period within the touch frame period.

Figure 18:
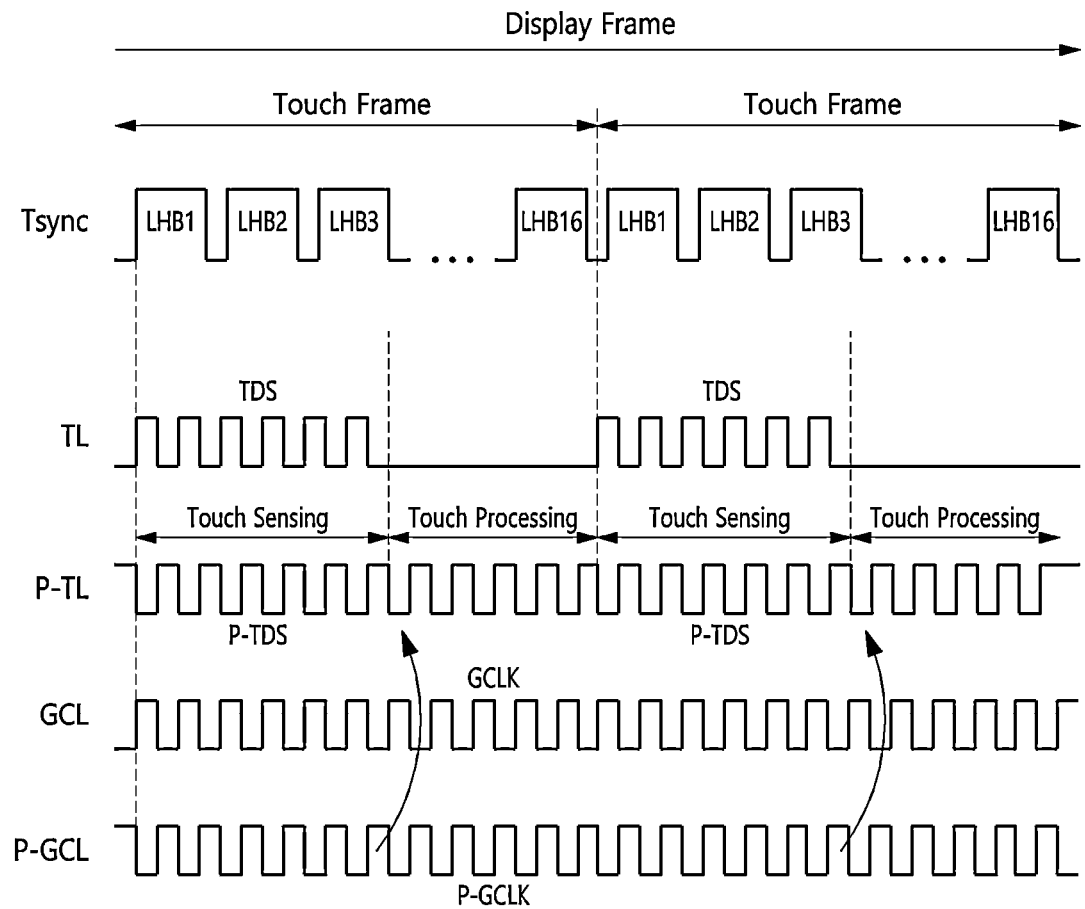
FIG. 18 is a diagram illustrating signal waveforms of the pseudo gate clock supplied through a pseudo touch line during the touch processing period when the display driving period proceeds simultaneously with the touch driving period in the touch display device according to embodiments of the disclosure.

FIG. 18 is a diagram illustrating signal waveforms of the pseudo gate clock supplied through a pseudo touch line during the touch processing period when the display driving period proceeds simultaneously with the touch driving period in the touch display device according to embodiments of the disclosure.

Referring to FIG. 18, a display frame period may overlap with a touch frame period in the touch display device 100 according to embodiments of the disclosure. At this time, the display driving operation in the display frame period may proceed independently from the touch driving operation in the touch frame period.

The touch circuit 150 may supply the touch driving signal TDS to the touch electrode line TEL through the touch line TL during some LHB within the touch frame period, and receive a touch sensing signal from the touch electrode line TEL. This period may be called a touch sensing period. At this time, the pseudo touch driving signal P-TDS with a phase opposite to the touch driving signal TDS may be supplied through the pseudo touch line P-TL.

The touch circuit 150 may perform a touch processing operation by extracting touch coordinates through a calculation for a touch sensing signal received from the touch electrode line TEL, and transmitting the touch coordinates to the timing controller 140. This period may be called a touch processing period. At this time, the touch processing period may be included in the some LHB within the touch frame period.

The touch driving signal TDS is not supplied to the touch line TL in the touch processing period. However, the pseudo gate clock P-GCLK supplied through the pseudo gate clock line P-GCL may also be supplied to the pseudo touch line P-TL during the touch processing period.

In this way, the amount of reduction of electromagnetic noise during the display driving period DP may be increased by supplying the pseudo gate clock P-GCLK not only to the pseudo gate clock line P-GCL but also to the pseudo touch line P-TL during the touch processing period within the display driving period DP.

Figure 19:
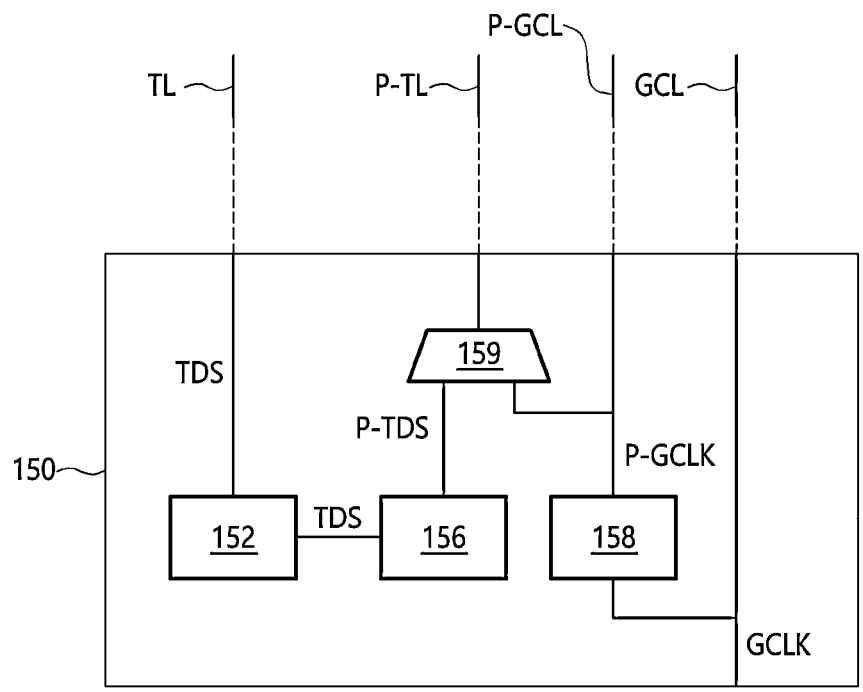
FIG. 19 is a block diagram illustrating a circuit for supplying a pseudo touch driving signal and a pseudo gate clock in a touch display device according to embodiments of the disclosure.

FIG. 19 is a block diagram illustrating a circuit for supplying a pseudo touch driving signal and a pseudo gate clock in a touch display device according to embodiments of the disclosure.

Referring to FIG. 19, the touch display device 100 according to embodiments of the disclosure may include a touch driving circuit 152, a first pseudo signal generator 156 (e.g., a circuit), a second pseudo signal generator 158 (e.g., a circuit), and a switching circuit 159.

The touch driving circuit 152 provides a touch driving signal TDS to at least one touch electrode TE among the plurality of touch electrodes TE disposed on the display panel 110 through the touch line TL.

In the case of the self-capacitance sensing scheme, the touch driving circuit 152 may supply a touch driving signal TDS and receive a touch sensing signal through the same touch line TL. On the other hand, in the case of the mutual-capacitance sensing scheme, the touch driving circuit 152 may supply the touch driving signal TDS through a driving touch line and may receive the touch sensing signal through a sensing touch line.

The first pseudo signal generator 156 may receive the touch driving signal TDS generated from the touch driving circuit 152 and may generate a pseudo touch driving signal P-TDS with a phase opposite to the touch driving signal TDS. The pseudo touch driving signal P-TDS may be supplied to the switching circuit 159.

The second pseudo signal generator 158 may receive the gate clock GCLK supplied from the timing controller 140 and may generate a pseudo gate clock P-GCLK with a phase opposite to the gate clock GCLK. The pseudo gate clock P-GCLK generated by the second pseudo signal generator 158 may be supplied to the pseudo gate clock line P-GCL and the switching circuit 159.

The switching circuit 159 may select the pseudo touch driving signal P-TDS or the pseudo gate clock P-GCLK depending on a control signal and may supply it to the pseudo touch line P-TL. The switching circuit 159 may supply a pseudo touch driving signal P-TDS to the pseudo touch line P-TL during the touch sensing period, and may supply the pseudo gate clock P-GCLK to the pseudo touch line P_TL during the touch processing period. The switching circuit 159 may be a multiplexer.

It may be said to be a pseudo signal control circuit including the first pseudo signal generator 156, the second pseudo signal generator 158, and the switching circuit 159.

Here, it illustrates a case where the first pseudo signal generator 156, the second pseudo signal generator 158, and the switching circuit 159 are disposed inside the touch circuit 150 as an example. However, the first pseudo signal generator 156 may be disposed inside the touch circuit 150, and the second pseudo signal generator 158 and the switching circuit 159 may be disposed outside the touch circuit 150.

Figure 20:
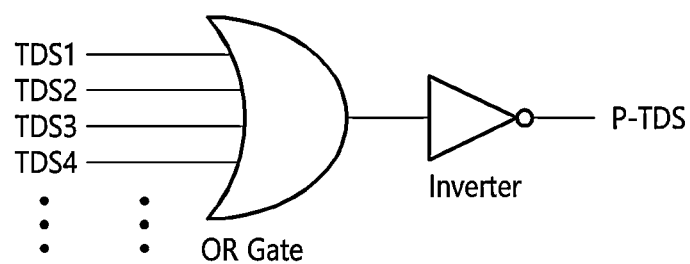
FIGS. 20 and 21 are diagrams illustrating circuits of a first pseudo signal generator and a second pseudo signal generator in a touch display device according to embodiments of the disclosure.
Figure 21:
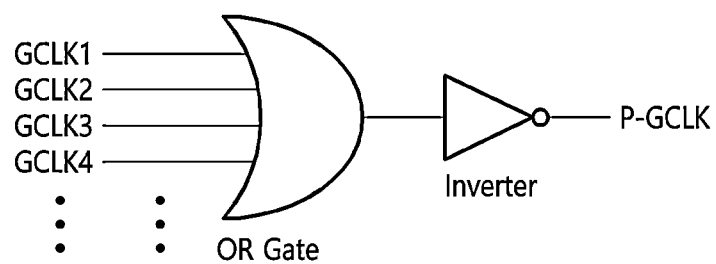

FIGS. 20 and 21 are diagrams illustrating circuits of a first pseudo signal generator 156 and a second pseudo signal generator 158 in a touch display device according to embodiments of the disclosure.

Referring to FIG. 20, the first pseudo signal generator 156 for generating the pseudo touch driving signal P-TDS in the touch display device 100 according to embodiments of the present disclosure may be composed of a circuit in which an OR logic gate OR Gate is connected to an inverter Inverter in series.

The OR logic gate OR Gate may receive a plurality of touch driving signals TDS1, TDS2, TDS3, TDS4, . . . with different input timings and sequentially transmit them. The inverter Inverter may invert each of the plurality of touch driving signals TDS1, TDS2, TDS3, TDS4, . . . to generate a pseudo touch driving signal P-TDS.

Referring to FIG. 21, the second pseudo signal generator 158 for generating a pseudo gate clock P-GCLK in the touch display device 100 according to embodiments of the disclosure may be composed of a circuit in which an OR logic gate OR Gate is connected to an inverter Inverter in series.

The OR logic gate OR Gate may receive multiple gate clocks GCLK1, GCLK2, GCLK3, GCLK4, . . . with different input timings and may transmit them sequentially. The inverter Inverter may invert each of the plurality of gate clocks GCLK1, GCLK2, GCLK3, GCLK4, . . . to generate a pseudo gate clock P-GCLK.

Meanwhile, the touch electrode TE formed on the display panel 110 may cover a plurality of pixels. That is, since the number of touch electrodes TE is smaller than the number of pixels, the number of pseudo touch lines P-TL may also be smaller than the number of pseudo gate clock lines P-GCL.

Therefore, it will be possible to reduce signal interference between pseudo lines through arrangement of the pseudo touch line P-TL and pseudo gate clock line P-GCL.

Figure 22:
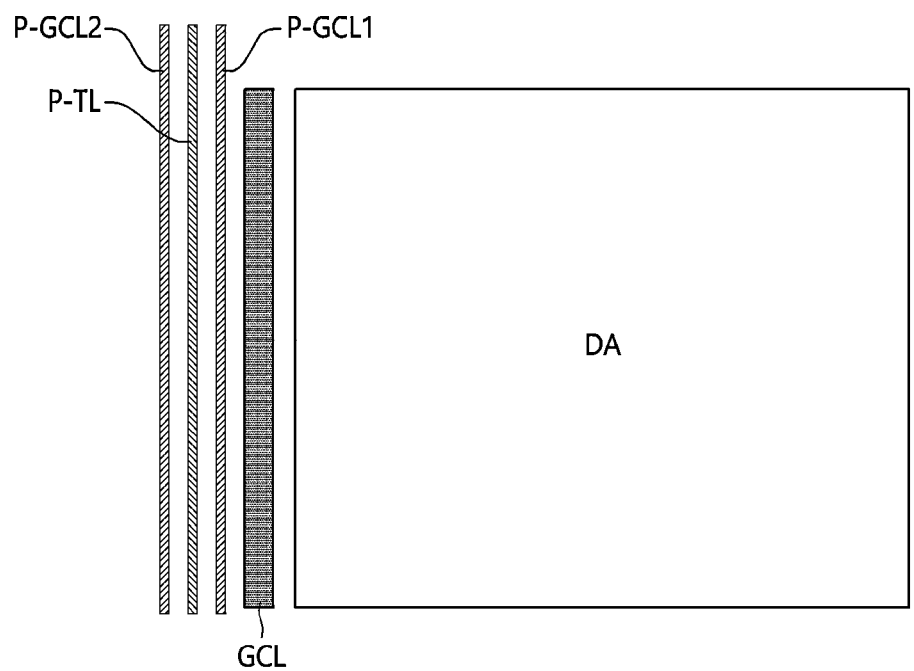
FIG. 22 is a plan view illustrating an arrangement of pseudo lines in a touch display device according to embodiments of the disclosure.

FIG. 22 is a plan view illustrating an arrangement of pseudo lines in a touch display device according to embodiments of the disclosure.

Referring to FIG. 22, the pseudo lines in the touch display device 100 according to embodiments of the disclosure may be located in a non-display area where pixels do not emit light.

At this time, the first pseudo gate clock line P-GCL1 and the second pseudo gate clock P-GCLK2 transmitting the pseudo gate clocks P-GCLK may be disposed separately outside the gate clock line GCL transmitting the gate clocks GCLK.

The first pseudo gate clock line P-GCL1 is a line that transmits the first pseudo gate clock with a phase opposite to the first gate clock among the gate clocks GCLK. The second pseudo gate clock line P-GCL2 is a line that transmits a second pseudo gate clock with a phase opposite to the second gate clock among the gate clocks GCLK.

The first gate clock and the second gate clock may be signals that separate a plurality of gate clocks into groups. Alternatively, in the case of a subpixel using a scan signal and an emission signal, the first gate clock may be a scan clock and the second gate clock may be an emission clock.

The pseudo touch line P-TL may have a layer different from that of the pseudo gate clock line P-GCL. However, they may be formed without overlapping each other to reduce signal interference between pseudo lines.

For the above purpose, a pseudo touch line P-TL may be placed between the first pseudo gate clock line P-GCL1 and the second pseudo gate clock line P-GCL2.

When the first gate clock is a scan clock and the second gate clock is an emission clock, a pseudo scan clock line may be placed outside the gate clock line GCL, a pseudo touch line may be placed outside the pseudo scan clock line, and a pseudo emission clock line may be placed outside the pseudo touch line.

Embodiments of the disclosure described above are briefly described below.

Embodiments of the disclosure may provide a touch display device comprising a display panel in which a plurality of subpixels are disposed in a display area, and a first pseudo signal line and a second pseudo signal line are disposed in a non-display area, a gate driving circuit configured to supply gate signals to the display panel using a plurality of gate clocks, a touch circuit configured to supply a plurality of touch driving signals to touch electrodes disposed on the display panel and detect touch coordinates by receiving touch sensing signals, a timing controller configured to control the gate driving circuit and the touch circuit, and a pseudo signal control circuit configured to control paths of a first pseudo signal and a second pseudo signal supplied to the first pseudo signal line and the second pseudo signal line.

The first pseudo signal is a pseudo touch driving signal with a phase opposite to the plurality of touch driving signals, and wherein the second pseudo signal is a pseudo gate clock with a phase opposite to the plurality of gate clocks.

The pseudo signal control circuit includes a first pseudo signal generator configured to generate the pseudo touch driving signal, a second pseudo signal generator configured to generate the pseudo gate clock and supply it to the second pseudo signal line, and a switching circuit configured to transmit a signal selected from the pseudo touch driving signal and the pseudo gate clock to the first pseudo signal line.

The pseudo touch driving signal is transmitted to the first pseudo signal line in a touch sensing period in which the plurality of touch driving signals are supplied to the touch electrodes, and wherein the pseudo gate clock is transmitted to the first pseudo signal line in a touch processing period in which touch coordinates are calculated from the touch sensing signals.

The touch processing period is a period in which the plurality of touch driving signals are not supplied to the touch electrodes.

In a time-division driving operation in which a touch driving period and a display driving period are temporally divided, wherein the touch sensing period is included in the touch driving period, and wherein the touch processing period is included in the display driving period.

The first pseudo signal generator includes an OR logic gate that receives the plurality of touch driving signals and sequentially transmits them, and an inverter that generates the pseudo touch driving signal by inverting each of the plurality of touch driving signals transmitted by the OR logic gate.

The second pseudo signal generator includes an OR logic gate that receives the plurality of gate clocks and sequentially transmits them, and an inverter that generates the pseudo gate clock by inverting each of the plurality of gate clocks transmitted by the OR logic gate.

The pseudo signal control circuit is implemented in the touch circuit.

Some of the second pseudo signal lines are disposed outside of gate clock lines transmitting the plurality of gate clocks, and others of the second pseudo signal lines are disposed outside the first pseudo signal line.

The some of the second pseudo signal lines are lines transmitting a pseudo scan signal with a phase opposite to a scan signal among the gate signals, and wherein the others of the second pseudo signal lines are lines transmitting a pseudo emission signal with a phase opposite to an emission signal among the gate signals.

Embodiments of the disclosure may provide a touch driving method, comprising a step of supplying a plurality of touch driving signals to touch electrodes disposed on a display panel, a step of supplying a first pseudo signal through a first pseudo signal line disposed in a non-display area of the display panel, a step of supplying gate signals to the display panel using a plurality of gate clocks, a step of supplying a second pseudo signal through a second pseudo signal line disposed in a non-display area of the display panel, and a step of controlling paths of the first pseudo signal and the second pseudo signal.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A touch display device, comprising:
   a display panel in which a plurality of subpixels are in a display area, and a first pseudo signal line and a second pseudo signal line are in a non-display area;
   a gate driving circuit configured to supply gate signals to the display panel using a plurality of gate clocks;
   a touch circuit configured to supply a plurality of touch driving signals to touch electrodes on the display panel and detect touch coordinates by receiving touch sensing signals;
   a timing controller configured to control the gate driving circuit and the touch circuit; and
   a pseudo signal control circuit configured to control paths of a first pseudo signal and a second pseudo signal supplied to the first pseudo signal line and the second pseudo signal line,
   wherein the first pseudo signal is a pseudo touch driving signal with a phase opposite to the plurality of touch driving signals, and the second pseudo signal is a pseudo gate clock with a phase opposite to the plurality of gate clocks.

2. The touch display device of claim 1, wherein the pseudo signal control circuit includes:
   a first pseudo signal generator configured to generate the pseudo touch driving signal;
   a second pseudo signal generator configured to generate the pseudo gate clock and supply the pseudo gate clock to the second pseudo signal line; and
   a switching circuit configured to transmit a signal selected from the pseudo touch driving signal and the pseudo gate clock to the first pseudo signal line.

3. The touch display device of claim 1, wherein the pseudo touch driving signal is transmitted to the first pseudo signal line in a touch sensing period in which the plurality of touch driving signals are supplied to the touch electrodes, and the pseudo gate clock is transmitted to the first pseudo signal line in a touch processing period in which touch coordinates are calculated from the touch sensing signals.

4. The touch display device of claim 3, wherein the touch processing period is a period in which the plurality of touch driving signals are not supplied to the touch electrodes.

5. The touch display device of claim 3, wherein in a time-division driving operation in which a touch driving period and a display driving period are temporally divided, the touch sensing period is included in the touch driving period, and the touch processing period is included in the display driving period.

6. The touch display device of claim 2, wherein the first pseudo signal generator includes:
   an OR logic gate that receives the plurality of touch driving signals and sequentially transmits the plurality of touch driving signals; and
   an inverter that generates the pseudo touch driving signal by inverting each of the plurality of touch driving signals transmitted by the OR logic gate.

7. The touch display device of claim 2, wherein the second pseudo signal generator includes:
   an OR logic gate that receives the plurality of gate clocks and sequentially transmits the plurality of gate clocks; and
   an inverter that generates the pseudo gate clock by inverting each of the plurality of gate clocks transmitted by the OR logic gate.

8. The touch display device of claim 2, wherein the pseudo signal control circuit is implemented in the touch circuit.

9. The touch display device of claim 1, wherein one or more second pseudo signal lines among second pseudo signal lines are outside of gate clock lines transmitting the plurality of gate clocks, and remaining one or more second pseudo signal lines among the second pseudo signal lines are outside the first pseudo signal line.

10. The touch display device of claim 9, wherein the one or more second pseudo signal lines transmit a pseudo scan signal with a phase opposite to a scan signal among the gate signals, and the remaining one or more second pseudo signal lines transmit a pseudo emission signal with a phase opposite to an emission signal among the gate signals.

11. The touch display device of claim 1, wherein at least one of the first pseudo signal line and the second pseudo signal line extends along at least one of the plurality of gate clocks.

12. A touch driving method, comprising:
supplying a plurality of touch driving signals to touch electrodes on a display panel;
supplying a first pseudo signal through a first pseudo signal line in a non-display area of the display panel;
supplying gate signals to the display panel using a plurality of gate clocks;
supplying a second pseudo signal through a second pseudo signal line in a non-display area of the display panel; and
controlling paths of the first pseudo signal and the second pseudo signal,
wherein the first pseudo signal is a pseudo touch driving signal with a phase opposite to the plurality of touch driving signals, and the second pseudo signal is a pseudo gate clock with a phase opposite to the plurality of gate clocks.

13. The touch driving method of claim 12, wherein the pseudo touch driving signal is transmitted to the first pseudo signal line in a touch sensing period in which the plurality of touch driving signals are supplied to the touch electrodes, and the pseudo gate clock is transmitted to the second pseudo signal line in a touch processing period in which touch coordinates are calculated from touch sensing signals.

14. The touch driving method of claim 13, wherein the touch processing period is a period in which the plurality of touch driving signals are not supplied to the touch electrodes.

15. The touch driving method of claim 13, wherein in a time-division driving operation in which a touch driving period and a display driving period are temporally divided, the touch sensing period is included in the touch driving period, and the touch processing period is included in the display driving period.

16. The touch driving method of claim 12, wherein one or more second pseudo signal lines among second pseudo signal lines are outside of gate clock lines transmitting the plurality of gate clocks, and remaining one or more second pseudo signal lines among the second pseudo signal lines are outside the first pseudo signal line.

17. The touch driving method of claim 16, wherein the one or more second pseudo signal lines transmit a pseudo scan signal with a phase opposite to a scan signal among the gate signals, and the remaining one or more second pseudo signal lines transmit a pseudo emission signal with a phase opposite to an emission signal among the gate signals.

18. The touch driving method of claim 12, wherein at least one of the first pseudo signal line and the second pseudo signal line extends along at least one of the plurality of gate clocks.

* * * * *